US012756818B2

(12) United States Patent

Kim et al.

(10) Patent No.: US 12,756,818 B2

(45) Date of Patent: *Oct. 6, 2026

(54) INTER-IMAGE COMPONENT PREDICTION METHOD, AND IMAGE ENCODING AND DECODING METHOD AND DEVICE USING SAME

(71) Applicant: Dolby International AB, Amsterdam Zuidoost (NL)

(72) Inventors: Jae Gon Kim, Goyang-si (KR); Do Hyeon Park, Goyang-si (KR); Yong Uk Yoon, Jeju-si (KR); Ji Hoon Do, Busan (KR)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/812,221

(22) Filed: Aug. 22, 2024

(65) Prior Publication Data

US 2024/0414324 A1 Dec. 12, 2024

Related U.S. Application Data

(63) Continuation of application No. 17/291,833, filed as application No. PCT/KR2019/016195 on Nov. 22, 2019, now Pat. No. 12,081,733.

(30) Foreign Application Priority Data

Nov. 23, 2018 (KR) ........................ 10-2018-0146571

(51) Int. Cl.

*H04N 19/105* (2014.01)
*H04N 19/109* (2014.01)

(Continued)

(52) U.S. Cl.

CPC ......... *H04N 19/105* (2014.11); *H04N 19/109* (2014.11); *H04N 19/167* (2014.11);

(Continued)

(58) Field of Classification Search

None

See application file for complete search history.

(56) References Cited

U.S. PATENT DOCUMENTS 10,477,205 B1 * 11/2019 Sim ...................... H04N 19/115
12,081,733 B2 9/2024 Kim et al.

(Continued)

FOREIGN PATENT DOCUMENTS

CN 107211124 A 9/2017
CN 107810635 A 3/2018

(Continued)

OTHER PUBLICATIONS

Notice of Allowance for CN 201980077062.3 by China National Intellectual Property Administration dated Feb. 7, 2024.

(Continued)

*Primary Examiner* — Michael J Hess

(74) *Attorney, Agent, or Firm* — Fish & Richardson P.C.

(57) ABSTRACT

An image encoding and decoding method comprises the steps of: determining an inter-component prediction mode of a chrominance component block on the basis of an inter-component prediction mode list and predetermined index information; determining a reference sample for inter-component prediction of the chrominance component block on the basis of the determined inter-component prediction mode; deriving the parameters of a linear prediction model by using the reference sample; and performing inter-component prediction for the chrominance component block by using the parameters of the linear prediction model.

20 Claims, 10 Drawing Sheets

(51) Int. Cl.

| | |
|---|---|
| ***H04N 19/167*** | (2014.01) |
| ***H04N 19/176*** | (2014.01) |
| ***H04N 19/186*** | (2014.01) |
| ***H04N 19/46*** | (2014.01) |

(52) U.S. Cl.

CPC ......... *H04N 19/176* (2014.11); *H04N 19/186* (2014.11); *H04N 19/46* (2014.11)

(56) References Cited

U.S. PATENT DOCUMENTS

| | | | | |
|---|---|---|---|---|
| 2016/0277762 | A1* | 9/2016 | Zhang | H04N 19/593 |
| 2017/0244975 | A1 | 8/2017 | Zhang et al. | |
| 2017/0359595 | A1 | 12/2017 | Zhang et al. | |
| 2018/0077426 | A1 | 3/2018 | Zhang et al. | |
| 2018/0176594 | A1* | 6/2018 | Zhang | H04N 19/59 |
| 2018/0205946 | A1* | 7/2018 | Zhang | H04N 19/103 |
| 2019/0327466 | A1* | 10/2019 | Ikai | H04N 19/176 |
| 2020/0288135 | A1* | 9/2020 | Laroche | H04N 19/105 |
| 2020/0296380 | A1* | 9/2020 | Aono | H04N 19/593 |
| 2021/0392321 | A1 | 12/2021 | Kim et al. | |

FOREIGN PATENT DOCUMENTS

| | | | |
|---|---|---|---|
| KR | 10-2015-0048637 | A | 5/2015 |
| KR | 10-2018-0061025 | A | 6/2018 |
| WO | 2017/222237 | A1 | 12/2017 |

OTHER PUBLICATIONS

Extended European Search Report for EP 23218554.6 by European Patent Office dated Feb. 28, 2024.

Extended European Search Report for EP19886160.1 by European Patent Office dated Jul. 17, 2022.

Zhang (UST) X et al: "New modes for chroma intra prediction", 7. JCT-VC Meeting; Nov. 21, 2011-Nov. 30, 2011; Geveva; (Joint Collaborative Team on Video Coding of ISO/IEC JTC1/SC29/WG11 and ITU-T SG. 16), No. JCTVC-G358, Nov. 22, 2011.

Geert Van Der Auwera et al: "Description of Core Experiment 3 (CE3): Intra Prediction and Mode Coding", 10. JVET Meeting; Apr. 10, 2018-Apr. 20, 2018; San Diego; (The Joint Video Exploration Team of ISO/IEC JTC1/SC29/WG11 and ITU-T SG. 16), No. JVET-J1023, Apr. 20, 2018.

Geert Van Der Auwera, et al., "Description of Core Experiment 3: Intra Prediction and Mode Coding", Joint Video Experts Team (JVET) of ITU-T SG 16 WP 3 and ISO/IEC JTC 1/SC 29/WG 11, 10th Meeting, Document: JVET-J1023_r2, Apr. 10-20, 2018, pp. 1-49, San Diego, USA.

International Search Report for PCT/KR2019/016195 dated Mar. 3, 2020 (PCT/ISA/210).

Office Action for CN 201980077062.3 by China National Intellectual Property Administration dated Aug. 16, 1 2023.

International Preliminary Report on Patentability in International Appln. No. PCT/KR2019/016195, mailed on May 25, 2021, 11 pages (with English Translation).

Jiang et al., "CE3: Multiple neighbor-based linear model (Test 5.3.1)," JVET-L0388r1, JVET 12th Meeting: Macao, CN Oct. 3-12, 2018, 4 pages.

Wang et al., "CE3: Adaptive multiple cross-component linear model (Test 5.9.1)," JVET-L0419, Jvet 12th Meeting: Macao, CN, Oct. 3-12, 2018, 3 pages.

Zhang et al., "Enhanced Cross-component Linear Model Intra-Prediction," JVET-D0110, ver4, Joint Video Exploration Team (JVET) of ITU-T SG 16 WP 3 and ISO/IEC JTC 1/SC 29/WG 11, 4th Meeting: Chengdu, CN, Oct. 15-21, 2016, 6 pages.

* cited by examiner

【FIG. 1】
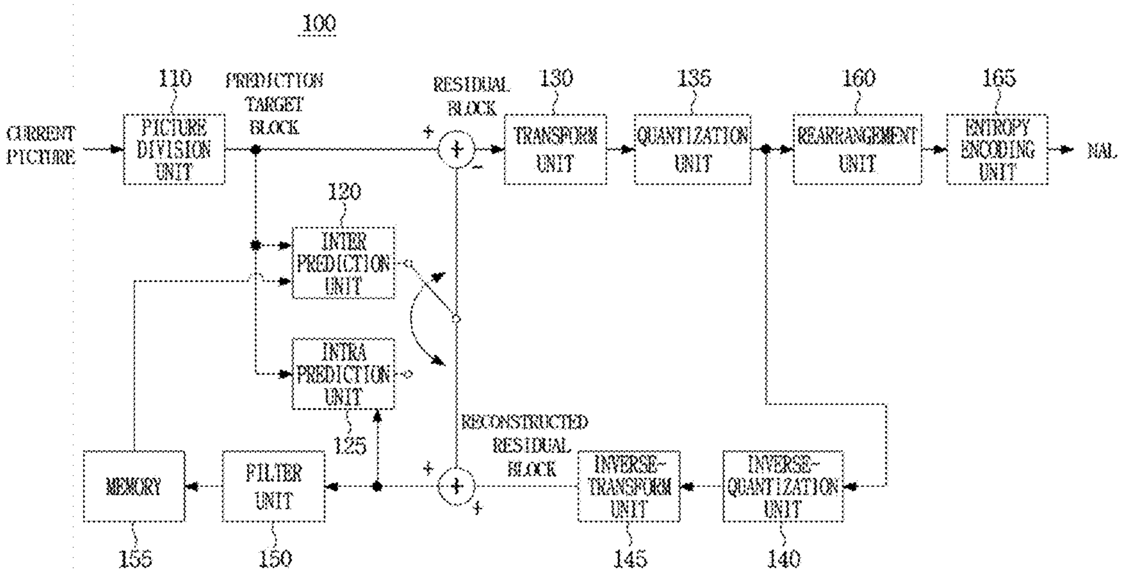
【FIG. 2】
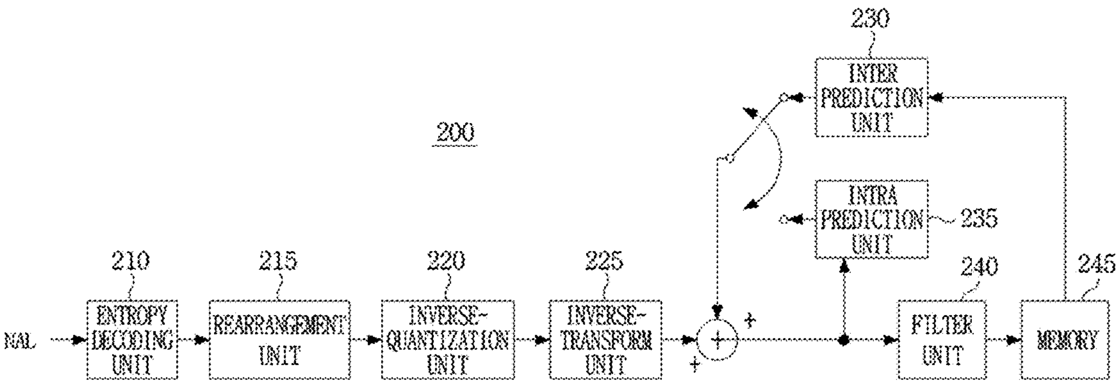

【FIG. 3】
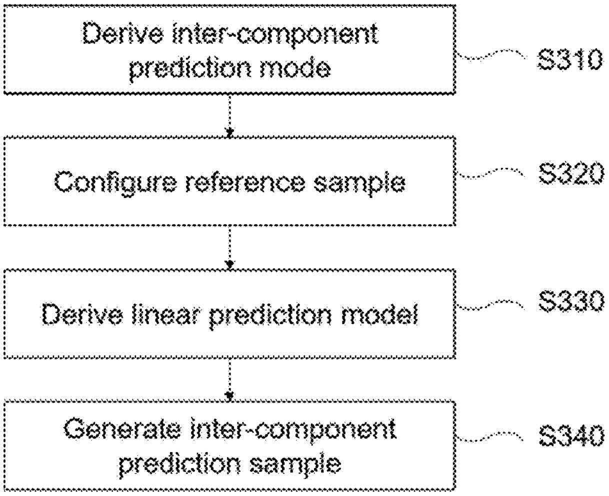
【FIG. 4】
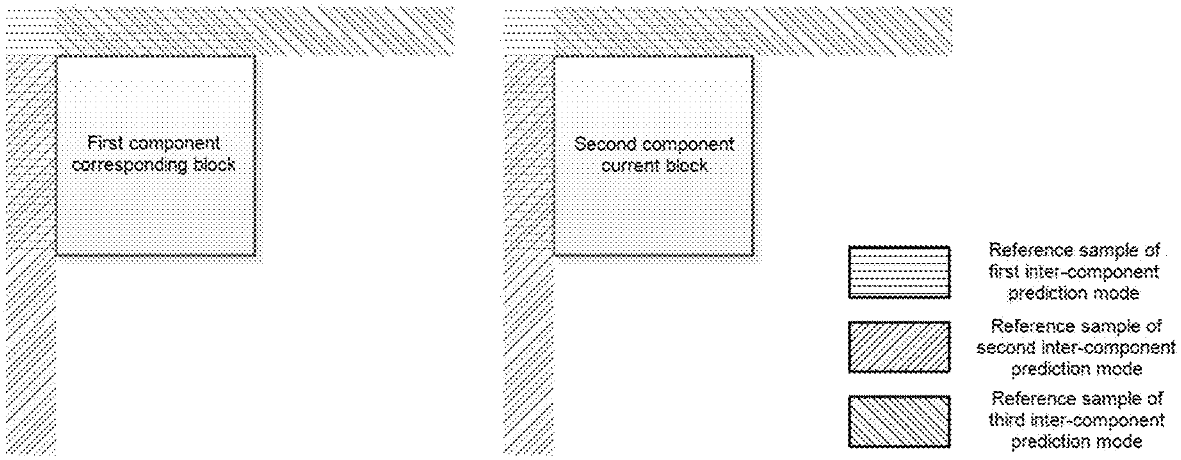

【FIG. 5】
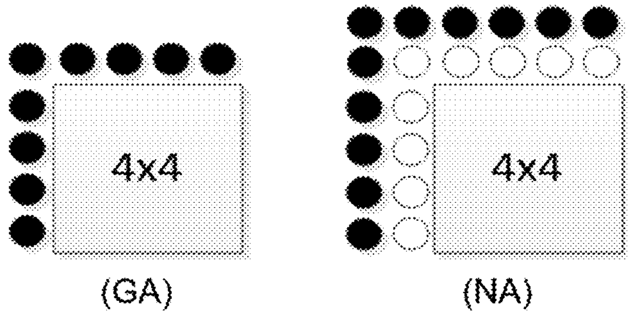
【FIG. 6】
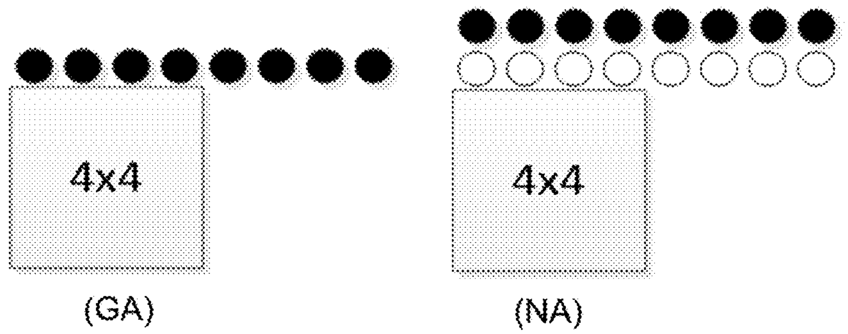
【FIG. 7】
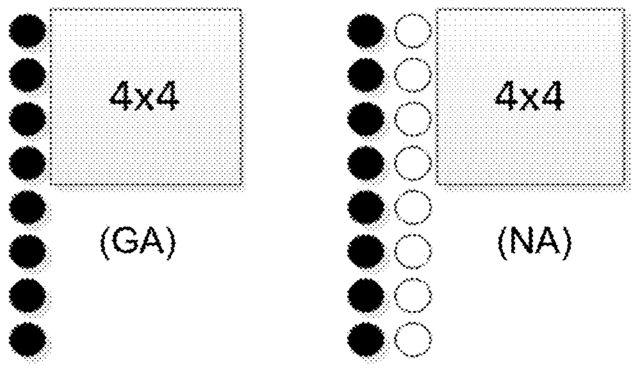

【FIG. 8】
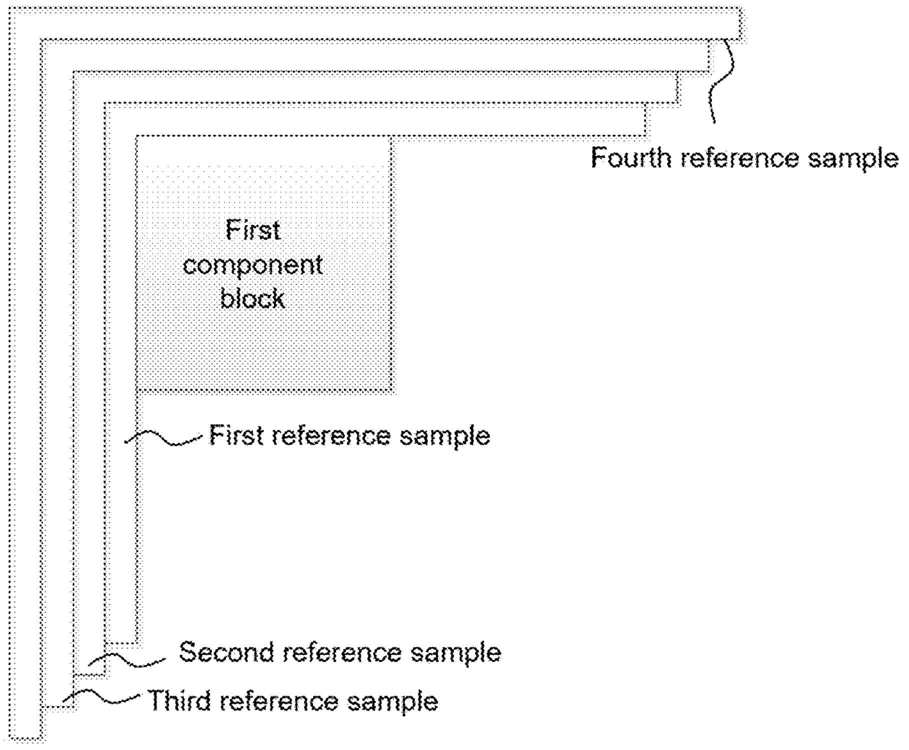

【FIG. 9】
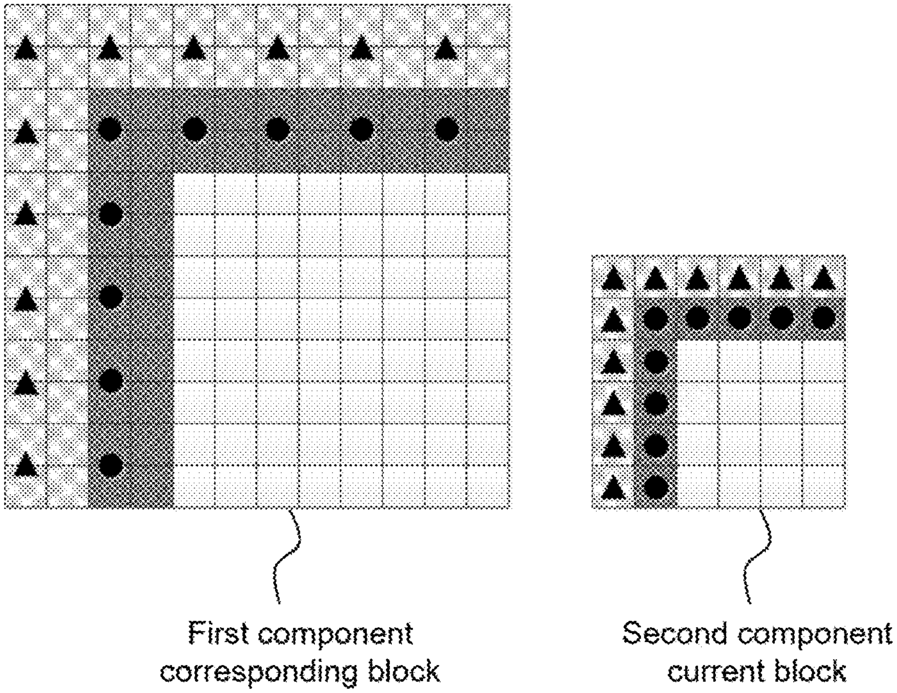

【FIG. 10】
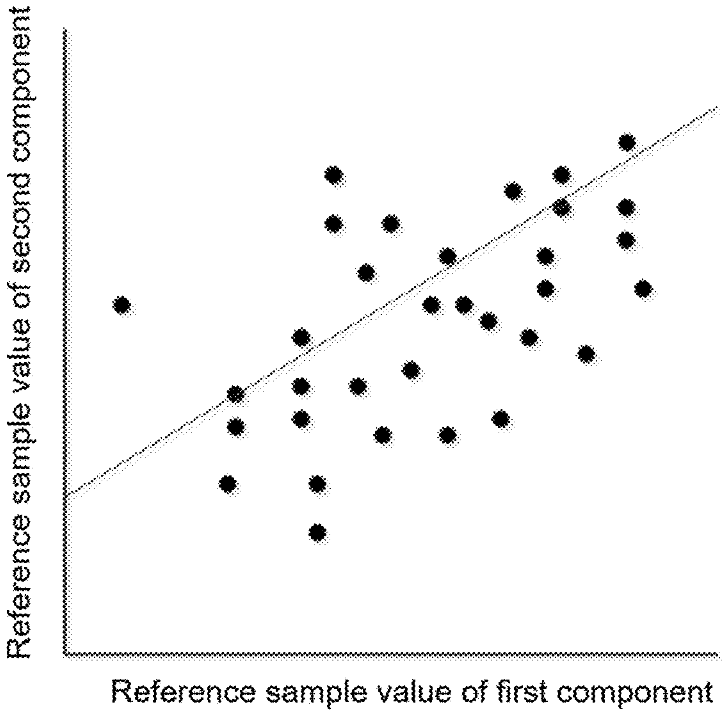
【FIG. 11】
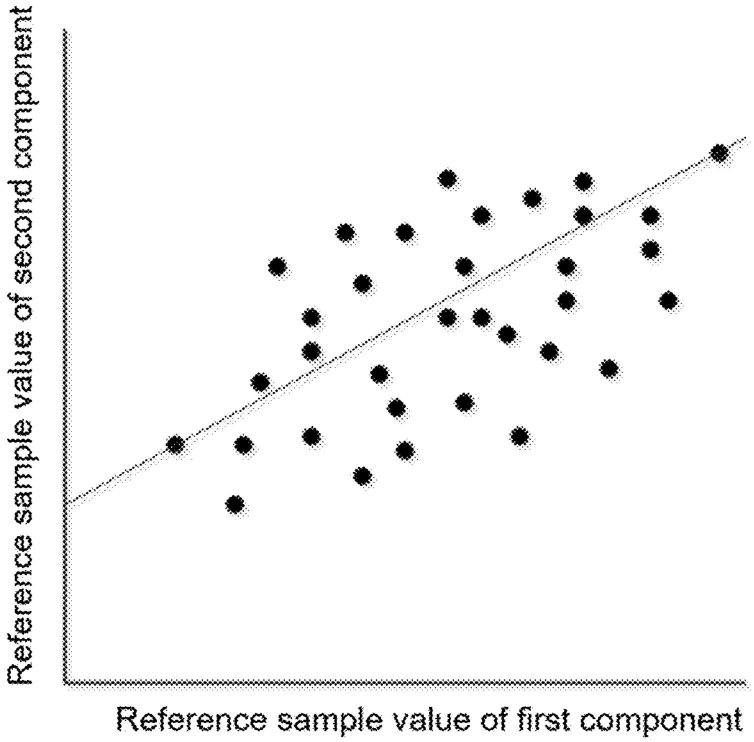

【FIG. 12】
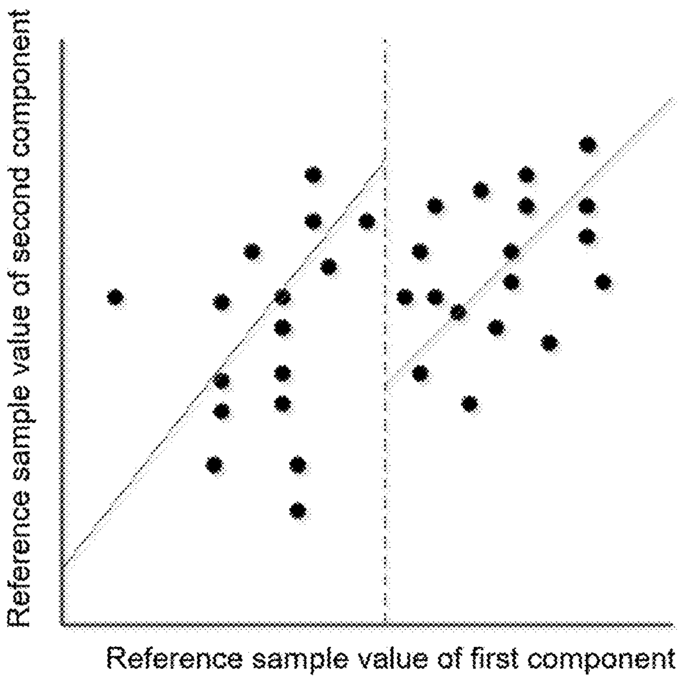
【FIG. 13】
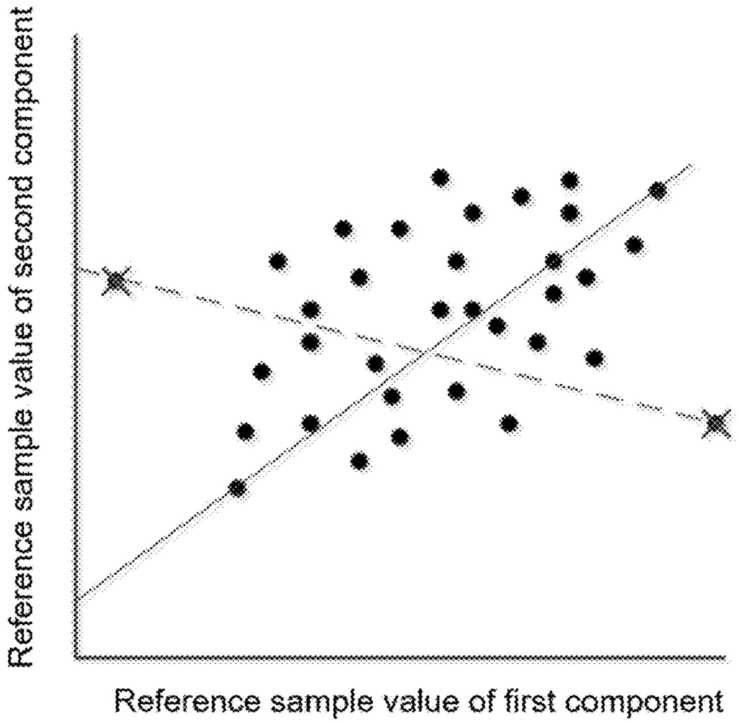

【FIG. 14】
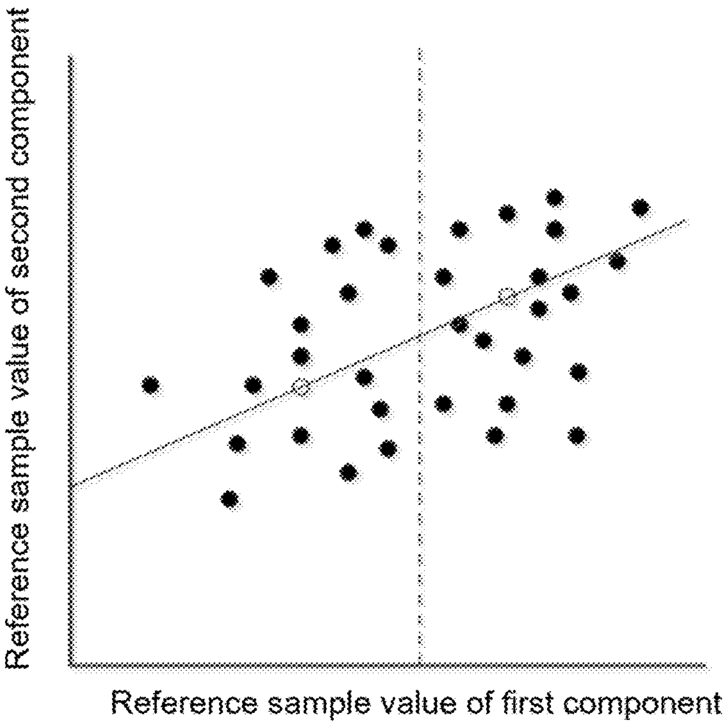
【FIG. 15】
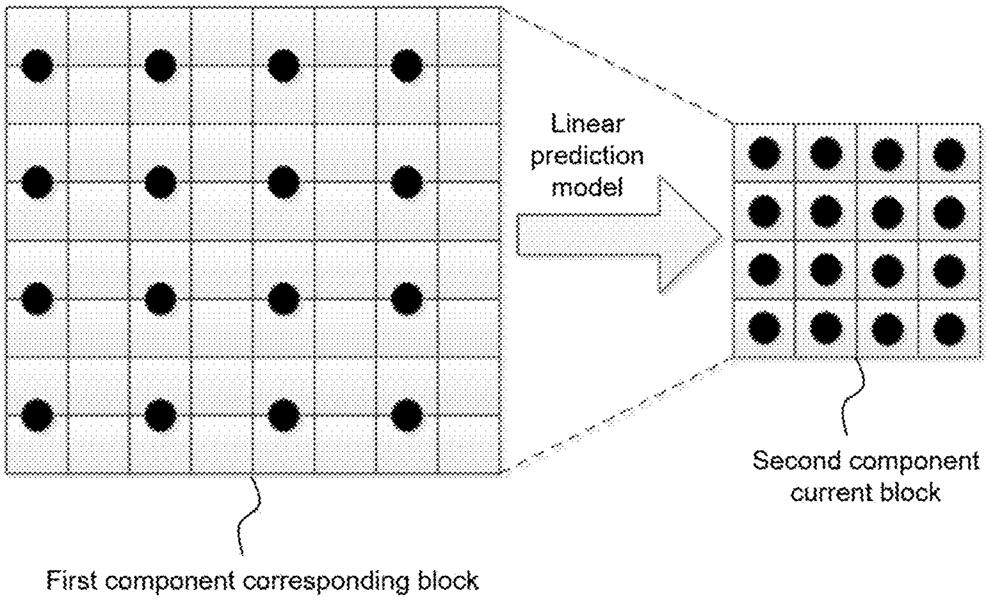

【FIG. 16】
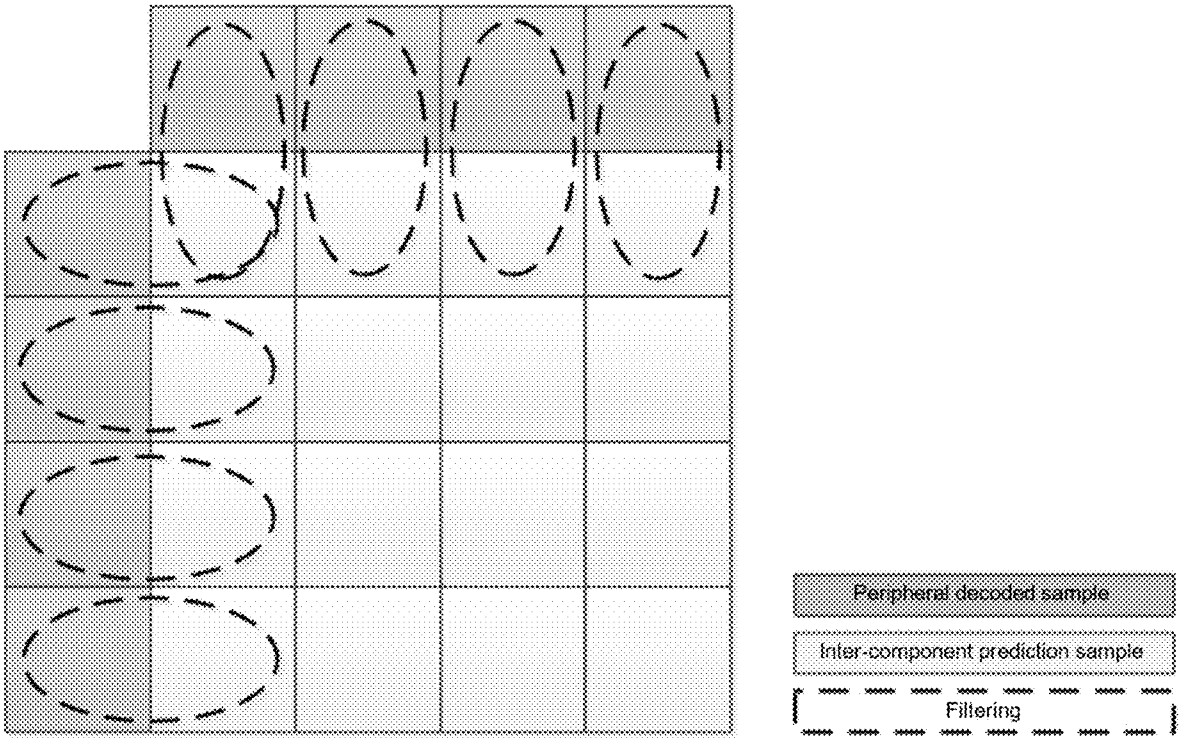

【FIG. 17】
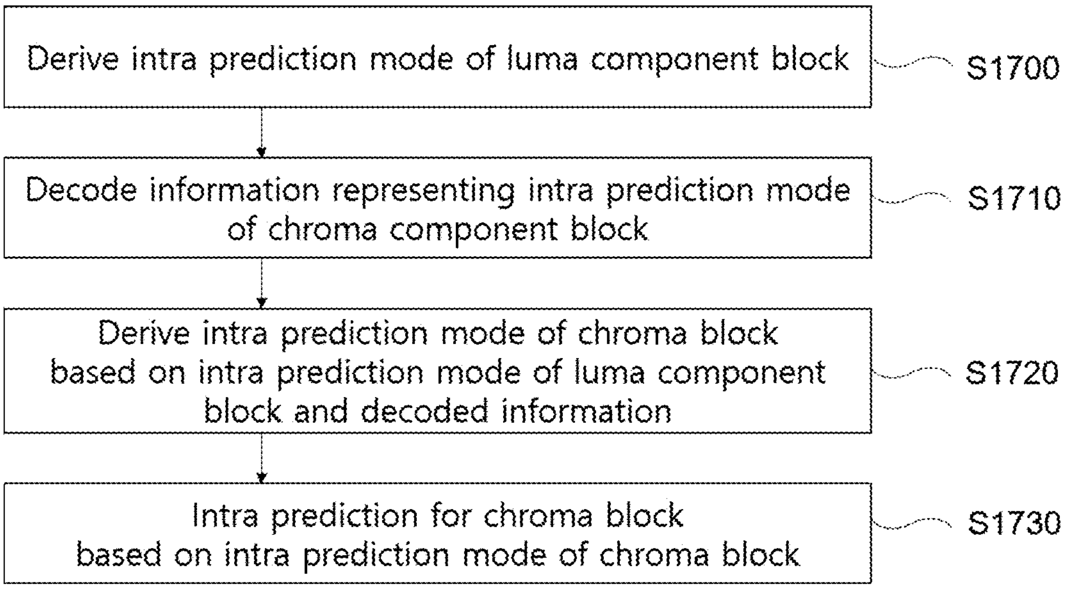

INTER-IMAGE COMPONENT PREDICTION METHOD, AND IMAGE ENCODING AND DECODING METHOD AND DEVICE USING SAME

CROSS REFERENCE TO RELATED APPLICATIONS

This application is a continuation of U.S. application Ser. No. 17/291,833, filed on May 6, 2021, which is a National Stage of International Application No. PCT/KR2019/016195 filed Nov. 22, 2019, claiming priority based on Korean Patent Application No. 10-2018-0146571 filed Nov. 23, 2018.

TECHNICAL FIELD

The present disclosure relates to an image encoding/decoding method and device.

BACKGROUND ART

A video image is compressed and encoded by removing spatiotemporal redundancy and inter-view redundancy, which may be transmitted over a communication line or stored in a form suitable for a storage medium.

Recently, a demand for high-resolution and high-quality images such as HD (High Definition) images and UHD (Ultra High Definition) images has increased in a variety of application fields. As image data becomes high-resolution and high-quality, the volume of data relatively increases compared to the existing image data, so when image data is transmitted by using media such as the existing wire and wireless broadband circuit or is stored by using the existing storage medium, expenses for transmission and expenses for storage increase. High efficiency image compression technologies may be utilized to resolve these problems which are generated as image data becomes high-resolution and high-quality.

There are various technologies such as an inter prediction technology which predicts a pixel value included in a current picture from a previous or subsequent picture of a current picture with an image impression technology, an intra prediction technology which predicts a pixel value included in a current picture by using pixel information in a current picture, an entropy encoding technology which assigns a short sign to a value with high appearance frequency and assigns a long sign to a value with low appearance frequency and so on, and image data may be effectively compressed and transmitted or stored by using these image compression technologies.

On the other hand, as a demand for a high resolution image has increased, a demand for stereo-scopic image contents has increased as a new image service. A video compression technology for effectively providing high resolution and ultra high resolution stereo-scopic image contents has been discussed.

DISCLOSURE

Technical Problem

The present disclosure seeks to improve encoding efficiency of a video signal.

The present disclosure seeks to provide at least one of a method in which a linear prediction model is derived by using reference samples of a luma component at a more suitable position, a method in which a linear prediction model for excluding an outlier value among luma reference samples is derived and a smoothing method for a prediction block (a prediction unit) obtained by inter-component prediction and/or a corresponding block boundary.

The present disclosure seeks to further provide a process in which an inter-component prediction mode is derived in a decoder without transmitting index information for a variety of inter-component prediction modes.

In color inter-component prediction encoding/decoding, the present disclosure seeks to provide a more suitable reference sample by considering a position and a sample value of a reference sample and provide a more suitable linear prediction model by using a determined reference sample.

The present disclosure seeks to provide a method of deriving an intra prediction mode for a luma/chroma component block.

Technical Solution

An image encoding/decoding method and device according to the present disclosure may determine an inter-component prediction mode of a chroma component block based on an inter-component prediction mode list and predetermined index information, determine reference samples for inter-component prediction of the chroma component block based on the determined inter-component prediction mode, derive a parameter of a linear prediction model by using the reference samples and perform inter-component prediction for the chroma component block by using a parameter of the linear prediction model.

In an image encoding/decoding method and device according to the present disclosure, the inter-component prediction mode list may be configured with k inter-component prediction modes.

In an image encoding/decoding method and device according to the present disclosure, determining the reference samples may downsample the reference samples for the inter-component prediction, classify the downsampled reference samples into a plurality of groups by comparing a size between the downsampled reference samples and calculate an average value of all or some of reference samples belonging to each group.

In an image encoding/decoding method and device according to the present disclosure, the downsampling may be selectively performed for a reference sample at a specific position.

In an image encoding/decoding method and device according to the present disclosure, the specific position may be determined based on encoding information on at least one of the chroma component block or a luma component block corresponding to the chroma component block.

In an image encoding/decoding method and device according to the present disclosure, the downsampling may be performed by using a neighboring sample adjacent to the reference sample at the specific position in at least one of a vertical direction, a horizontal direction or a diagonal direction.

In an image encoding/decoding method and device according to the present disclosure, the downsampling may be performed based on at least one of availability of a peripheral block of the luma component block, a CTU related parameter or a predetermined flag and the flag may represent whether a sample of the chroma component block has a position shifted by a predetermined distance from a corresponding sample position of the luma component block.

In an image encoding/decoding method and device according to the present disclosure, an intra prediction mode of a chroma component block may be derived by using an intra prediction mode of a luma component block and information representing an intra prediction mode of a chroma component block.

In an image encoding/decoding method and device according to the present disclosure, an intra prediction mode of the luma component block may be derived based on an intra prediction mode list configured with one or more candidate modes.

In an image encoding/decoding method and device according to the present disclosure, an intra prediction mode of the luma component block may be derived based on an intra prediction mode list configured with one or more candidate modes.

In an image encoding/decoding method and device according to the present disclosure, m intra prediction mode lists may be defined and herein, m may be an integer such as 2, 3, or more.

In an image encoding/decoding method and device according to the present disclosure, a candidate mode of a first intra prediction mode list may be configured only with a default mode and the default mode may be any one of a planar mode or a DC mode, which is a non-directional mode.

In an image encoding/decoding method and device according to the present disclosure, a candidate mode of a second intra prediction mode list may include at least one of an intra prediction mode of a peripheral block of a luma component block, a mode derived by adding or subtracting a value of n to or from an intra prediction mode of the peripheral block, a vertical/horizontal mode or a mode derived by adding or subtracting a value of n to or from a vertical/horizontal mode.

In an image encoding/decoding method and device according to the present disclosure, any one of the plurality of intra prediction mode lists may be selectively used by using a plurality of flag information.

Advantageous Effects

As the present disclosure relates to a method and a device for encoding/decoding an image by using image inter-component prediction, the present disclosure seeks to improve performance of image inter-component prediction by performing at least one of 1) a process in which a linear prediction model is derived by using reference samples of a luma component at a more suitable position, 2) a process in which a linear prediction model is derived by using a more suitable reference sample considering the exclusion of an outlier value among luma reference samples, 3) a smoothing process for a prediction block (a prediction unit) obtained by inter-component prediction and/or a corresponding block boundary. The smoothing process is to increase a correlation with a peripheral block and remove a discontinuous boundary. In addition, the present disclosure may further include 4) a process in which an inter-component prediction mode is derived in a decoder without transmitting index information for a variety of inter-component prediction modes, and it seeks to reduce the amount of signaling bits for transmitting index information.

In color inter-component prediction encoding/decoding, a more suitable reference sample may be determined by considering a position and a sample value of a reference sample. A linear prediction model may be derived by using a determined reference sample. Through it, a more effective prediction signal may be generated. In addition, the amount of bits generated by image inter-component prediction may be reduced by using a method of deriving a mode in a decoder without transmitting index information for an inter-component prediction mode. In addition, a visual artifact may be reduced and encoding efficiency may be improved through smoothing filtering for a block boundary.

The present disclosure on performance improvement of an inter-component prediction encoding technology is also highly likely to be included in next-generation standards and is expected to be utilized as a new video codec for immersive media application service such as HD/UHD, a 360 video, etc. and relevant products.

DESCRIPTION OF DIAGRAMS

FIG. 1 is a block diagram showing an image encoding device according to an embodiment of the present disclosure.

FIG. 2 is a block diagram showing an image decoding device according to an embodiment of the present disclosure.

FIG. 3 is a block diagram of inter-component prediction encoding/decoding related to the present disclosure.

FIGS. 4 to 16 relate to an inter-component prediction method and filtering method.

FIG. 17 shows an intra prediction method for a coding block of a chroma component as an embodiment to which the present disclosure is applied.

BEST MODE

An image encoding/decoding method and device according to the present disclosure may determine an inter-component prediction mode of a chroma component block based on an inter-component prediction mode list and predetermined index information, determine reference samples for inter-component prediction of the chroma component block based on the determined inter-component prediction mode, derive a parameter of a linear prediction model by using the reference samples and perform inter-component prediction for the chroma component block.

In an image encoding/decoding method and device according to the present disclosure, the inter-component prediction mode list may be configured with k inter-component prediction modes.

In an image encoding/decoding method and device according to the present disclosure, determining the reference samples may downsample the reference samples for the inter-component prediction, classify the downsampled reference samples into a plurality of groups by comparing a size between the downsampled reference samples and calculate an average value of all or some of reference samples belonging to each group.

In an image encoding/decoding method and device according to the present disclosure, the downsampling may be selectively performed for a reference sample at a specific position.

In an image encoding/decoding method and device according to the present disclosure, the specific position may be determined based on encoding information on at least one of the chroma component block or a luma component block corresponding to the chroma component block.

In an image encoding/decoding method and device according to the present disclosure, the downsampling may be performed by using a neighboring sample adjacent to the reference sample at the specific position in at least one of a vertical direction, a horizontal direction or a diagonal direction.

In an image encoding/decoding method and device according to the present disclosure, the downsampling may be performed based on at least one of availability of a peripheral block of the luma component block, a CTU related parameter or a predetermined flag and the flag may represent whether a sample of the chroma component block has a position shifted by a predetermined distance from a corresponding sample position of the luma component block.

In an image encoding/decoding method and device according to the present disclosure, an intra prediction mode of a chroma component block may be derived by using an intra prediction mode of a luma component block and information representing an intra prediction mode of a chroma component block.

In an image encoding/decoding method and device according to the present disclosure, an intra prediction mode of the luma component block may be derived based on an intra prediction mode list configured with one or more candidate modes.

In an image encoding/decoding method and device according to the present disclosure, an intra prediction mode of the luma component block may be derived based on an intra prediction mode list configured with one or more candidate modes.

In an image encoding/decoding method and device according to the present disclosure, m intra prediction mode lists may be defined and herein, m may be an integer such as 2, 3, or more.

In an image encoding/decoding method and device according to the present disclosure, a candidate mode of a first intra prediction mode list may be configured only with a default mode and the default mode may be any one of a planar mode or a DC mode which is a non-directional mode.

In an image encoding/decoding method and device according to the present disclosure, a candidate mode of a second intra prediction mode list may include at least one of an intra prediction mode of a peripheral block of a luma component block, a mode derived by adding or subtracting a value of n to or from an intra prediction mode of the peripheral block, a vertical/horizontal mode or a mode derived by adding or subtracting a value of n to or from a vertical/horizontal mode.

In an image encoding/decoding method and device according to the present disclosure, any one of the plurality of intra prediction mode lists may be selectively used by using a plurality of flag information.

Mode for Invention

As the present disclosure may make various changes and have several embodiments, specific embodiments will be illustrated in a diagram and described in detail. But, it is not intended to limit the present disclosure to a specific embodiment, and it should be understood that it includes all changes, equivalents or substitutes included in an idea and a technical range of the present disclosure. A similar reference sign is used for a similar component while describing each diagram.

A term such as first, second, etc. may be used to describe various components, but the components should not be limited by the terms. The terms are used only to distinguish one component from other components. For example, without going beyond a scope of a right of the present disclosure, a first component may be referred to as a second component and similarly, a second component may be also referred to as a first component. A term "and/or" includes a combination of a plurality of relative entered items or any item of a plurality of relative entered items.

When a component is referred to as being "linked" or "connected" to other component, it should be understood that it may be directly linked or connected to other component, but other component may exist in the middle. On the other hand, when a component is referred to as being "directly linked" or "directly connected" to other component, it should be understood that other component does not exist in the middle.

As terms used in this application are only used to describe a specific embodiment, they are not intended to limit the present disclosure. Expression of the singular includes expression of the plural unless it clearly has a different meaning contextually. In this application, it should be understood that a term such as "include" or "have", etc. is to designate the existence of characteristics, numbers, stages, motions, components, parts or their combinations entered in a specification, but is not to exclude the existence or possibility of addition of one or more other characteristics, numbers, stages, motions, components, parts or their combinations in advance.

Unless otherwise defined, all terms used herein including technical or scientific terms mean the same as generally understood by those with ordinary skills in the art to which the present disclosure pertains. The terms which are generally used and are defined in a dictionary should be interpreted as having the same contextual meaning as a related technology and unless clearly defined in the present disclosure, they are not interpreted as being ideal or excessively formal.

Hereinafter, referring to the attached diagrams, a desirable embodiment of the present disclosure will be described in more detail. Hereinafter, the same reference sign is used for the same component in a diagram and an overlapping description for the same component is omitted.

FIG. 1 shows a rough block diagram of an encoding device as an embodiment of the present disclosure.

In reference to FIG. 1, an encoding device 100 may include a picture division unit 110, a prediction unit 120, 125, a transform unit 130, a quantization unit 135, a rearrangement unit 160, an entropy encoding unit 165, a dequantization unit 140, an inverse transform unit 145, a filter unit 150 and a memory 155.

As each construction unit shown in FIG. 1 is independently shown to represent different characteristic functions in an image encoding device, it may mean that each construction unit is configured with a separated hardware. But, as each construction unit is included by being enumerated as each construction unit for convenience of description, at least two construction units among each construction unit may be combined to configure one construction unit or one construction unit may be divided into a plurality of construction units to perform a function, and such an integrated embodiment and separated embodiment of each construction unit are also included in a scope of a right of the present disclosure as long as they are not beyond the essence of the present disclosure.

In addition, some components may be just a selective component for improving performance, not an essential component performing an essential function in the present disclosure. The present disclosure may be implemented by including only a construction unit necessary for implementing the essence of the present disclosure excluding a component used only for performance improvement, and a structure including only an essential component excluding a selective component used only for performance improvement is also included in a scope of a right of the present disclosure.

A picture division unit 110 may partition an input picture into at least one block. In this case, a block may mean a coding unit (CU), a prediction unit (PU) or a transform unit (TU). The partitioning may be performed based on at least one of quad tree, binary tree or ternary tree. Quad tree is a method in which a higher block is partitioned into 4 lower blocks that a width and a height are half of a higher block. Binary tree is a method in which a higher block is partitioned into 2 lower blocks that any one of a width or a height is half of a higher block. In binary tree, a block may have a non-square shape as well as a square shape through the above-described binary tree-based partitioning that a height of a higher block is half.

Hereinafter, in an embodiment of the present disclosure, a coding unit may be used as a unit performing encoding or may be used as a unit performing decoding.

A prediction unit 120 and 125 may include an inter prediction unit 120 performing inter prediction and an intra prediction unit 125 performing intra prediction. Whether to use inter prediction or whether to perform intra prediction for a prediction unit may be determined and concrete information according to each prediction method (e.g., an intra prediction mode, a motion vector, a reference picture, an indicator of an inter-component prediction mode, index information, etc.) may be determined. In this case, a processing unit that prediction is performed may be different from a processing unit that a prediction method and concrete contents are determined. For example, a prediction method, a prediction mode, etc. may be determined in a prediction unit and prediction may be performed in a transform unit. A residual value (a residual block) between a generated prediction block and an original block may be input into a transform unit 130. In addition, prediction mode information, motion vector information, an indicator of an inter-component prediction mode, index information, etc. used for prediction may be encoded in an entropy encoding unit 165 with a residual value and transmitted to a decoding device. When a specific encoding mode is used, it is possible to encode an original block as it is and transmit it to a decoding unit without generating a prediction block through a prediction unit 120 and 125.

An inter prediction unit 120 may predict a prediction unit based on information of at least one picture of a previous picture or a subsequent picture of a current picture or may predict a prediction unit based on information of some regions which are encoded in a current picture in some cases. An inter prediction unit 120 may include a reference picture interpolation unit, a motion prediction unit and a motion compensation unit.

In a reference picture interpolation unit, reference picture information may be provided from a memory 155 and pixel information equal to or less than an integer pixel may be generated in a reference picture. For a luma pixel, a DCT-based 8-tap interpolation filter with a different filter coefficient may be used to generate pixel information equal to or less than an integer pixel in a ¼ pixel unit. For a chroma signal, a DCT-based 4-tap interpolation filter with a different filter coefficient may be used to generate pixel information equal to or less than an integer pixel in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS (New Three-Step Search Algorithm), etc. may be used. A motion vector may have a motion vector value in a ½ or ¼ pixel unit based on an interpolated pixel. In a motion prediction unit, a current prediction unit may be predicted by making a motion prediction method different. As a motion prediction method, various methods such as a skip method, a merge method, an AMVP (Advanced Motion Vector Prediction) method, etc. may be used.

An intra prediction unit 125 may generate a prediction unit based on reference pixel information around a current block, pixel information in a current picture. When a reference pixel is a pixel which performed inter prediction because a peripheral block in a current prediction unit is a block which performed inter prediction, a reference pixel included in a block which performed inter prediction may be used by being substituted with reference pixel information of a block which performed peripheral intra prediction. In other words, when a reference pixel is unavailable, unavailable reference pixel information may be used by being substituted with at least one reference pixel of available reference pixels.

In intra prediction, a prediction mode may have a directional prediction mode which uses reference pixel information according to a prediction direction and a nondirectional mode which does not use directional information when prediction is performed. A mode for predicting a luma component may be different from a mode for predicting a chroma component and a chroma component may be predicted by using an intra prediction mode used to predict a luma component or a predicted/reconstructed luma component.

Intra prediction may be performed by inter-component prediction. When intra prediction is performed by inter-component prediction, intra prediction may not be performed by a prediction mode. When inter-component prediction is performed, it may represent that a prediction unit of a component (a second component) which is predicted by using a component (a first component) used for prediction is generated. In this case, a first component may be a luma component and a second component may be a chroma component. Inter-component prediction may be determined based on indicator index information of an inter-component prediction mode. In this case, an indicator and index information of an inter-component prediction mode may be encoded by entropy encoding.

A method in which intra prediction is performed by a prediction mode may include generating a prediction block after an AIS (Adaptive Intra Smoothing) filter is applied to a reference pixel according to an intra prediction mode. A type of an AIS filer applied to a reference pixel may be different. An intra prediction mode in a current prediction unit may be predicted from an intra prediction mode in a prediction unit around a current prediction unit to perform an intra prediction method. When a prediction mode in a current prediction unit is predicted by using mode information predicted from a peripheral prediction unit, information that an intra prediction mode of a current prediction unit is the same as that of a peripheral prediction unit may be transmitted by using predetermined flag information if an intra prediction mode of a current prediction unit is the same as that of a peripheral prediction unit and intra prediction mode information of a current block may be encoded by performing entropy encoding if an intra prediction mode of a current prediction unit is different from that of a peripheral prediction unit.

In addition, a residual block including residual value information, a difference value between a prediction unit generated in a prediction unit 120 and 125 and an original block, may be generated. A generated residual block may be input into a transform unit 130.

A transform unit 130 may transform a residual block including residual data by using a transform type such as DCT, DST, etc. In this case, a transform type may be determined based on an intra prediction mode in a prediction unit used to generate a residual block.

A quantization unit 135 may quantize values which are transformed into a frequency domain in a transform unit 130. According to a block or according to importance of an image, a quantization coefficient may be changed. A value calculated in a quantization unit 135 may be provided to a dequantization unit 140 and a rearrangement unit 160.

A rearrangement unit 160 may perform rearrangement of a coefficient value for a quantized residual value. A rearrangement unit 160 may change a two-dimensional block-shaped coefficient into a one-dimensional vector shape through a coefficient scanning method. For example, in a rearrangement unit 160, a DC coefficient to a coefficient in a high frequency domain may be scanned by using a predetermined scanning type and may be changed into a one-dimensional vector shape.

An entropy encoding unit 165 may perform entropy encoding based on values calculated by a rearrangement unit 160. For example, entropy encoding may use various encoding methods such as Exponential Golomb, CAVLC (Context-Adaptive Variable Length Coding), CABAC (Context-Adaptive Binary Arithmetic Coding).

An entropy encoding unit 165 may encode various information such as residual coefficient information and block type information, an indicator of an inter-component prediction mode, index information, prediction mode information, partitioning unit information, prediction unit information and transmission unit information, motion vector information, reference frame information, interpolation information of a block, filtering information, etc. in a coding unit from a rearrangement unit 160 and a prediction unit 120 and 125.

In an entropy encoding unit 165, a coefficient value in a coding unit input in a rearrangement unit 160 may be entropy-encoded.

In a dequantization unit 140 and an inverse transform unit 145, values quantized in a quantization unit 135 are dequantized and values transformed in a transform unit 130 are inversely transformed. A residual value generated in a dequantization unit 140 and an inverse transform unit 145 may generate a reconstructed block by being combined with a prediction unit which is predicted through a motion prediction unit, a motion compensation unit and an intra prediction unit included in a prediction unit 120 and 125.

A filter unit 150 may include at least one of a deblocking filter, an offset modification unit and an ALF (Adaptive Loop Filter).

A deblocking filter may remove block distortion generated by a boundary between blocks in a reconstructed picture. Whether a deblocking filter will be applied to a current block may be determined based on a pixel included in several columns or rows included in a block in order to determine whether deblocking will be performed. When a deblocking filter is applied to a block, a strong filter or a weak filter may be applied according to strength of necessary deblocking filtering. In addition, in applying a deblocking filter, horizontal directional filtering and vertical directional filtering may be processed in parallel when vertical filtering and horizontal filtering are performed.

An offset modification unit may modify an offset with an original image in a pixel unit for an image which performed deblocking. A method in which a pixel included in an image is divided into the certain number of regions, a region which will perform an offset is determined and an offset is applied to a corresponding region or a method in which an offset is applied by considering edge information of each pixel may be used to perform offset modification for a specific picture.

ALF (Adaptive Loop Filtering) may be performed based on a value comparing a filtered reconstructed image with an original image. After a pixel included in an image is divided into predetermined groups and one filter which will be applied to a corresponding group is determined, filtering may be performed discriminately per group. Information related to whether an ALF will be applied may be transmitted per coding unit (CU) for a luma signal and a shape and a filter coefficient of an ALF filter which will be applied may be different according to each block. In addition, an ALF filter in the same shape (fixed shape) may be applied regardless of a feature of a block to be applied.

A memory 155 may store a reconstructed block or picture calculated in a filter unit 150 and a stored reconstructed block or picture may be provided for a prediction unit 120 and 125 when inter prediction is performed.

FIG. 2 shows a rough block diagram of a decoding device as an embodiment of the present disclosure.

In reference to FIG. 2, a decoding device 200 may include an entropy decoding unit 210, a rearrangement unit 215, a dequantization unit 220, an inverse transform unit 225, a prediction unit 230 and 235, a filter unit 240 and a memory 245.

As each construction unit shown in FIG. 2 is independently shown to represent different characteristic functions in a decoding device, it may mean that each construction unit is configured with a separated hardware. But, as each construction unit is included by being enumerated as each construction unit for convenience of description, at least two construction units among each construction unit may be combined to configure one construction unit or one construction unit may be divided into a plurality of construction units to perform a function, and such an integrated embodiment and separated embodiment of each construction unit are also included in a scope of a right of the present disclosure as long as they are not beyond the essence of the present disclosure.

An entropy decoding unit 210 may perform entropy decoding for an input bitstream. For example, for entropy decoding, various methods such as Exponential Golomb, CAVLC(Context-Adaptive Variable Length Coding) and CABAC(Context-Adaptive Binary Arithmetic Coding) may be applied.

In an entropy decoding unit 210, information related to intra prediction and inter prediction performed in an encoding device may be decoded.

A rearrangement unit 215 may perform rearrangement for a bitstream entropy-decoded in an entropy decoding unit 210. Coefficients represented in a one-dimensional vector shape may be reconstructed into coefficients in a two-dimensional block shape and may be rearranged. In a rearrangement unit 215, information related to coefficient scanning performed in an encoding device may be provided and rearrangement may be performed in an inverse scanning method based on a scanning order performed in a corresponding encoding device.

A dequantization unit 220 may perform dequantization based on a quantization parameter and a coefficient value of a rearranged block.

An inverse transform unit 225 may inversely transform a dequantized transform coefficient in a predetermined transform type. In this case, a transform type may be determined based on at least one of information on a prediction mode (inter/intra prediction), a size/a shape of a block, an intra prediction mode, a component type (a luma/chroma component), a partitioning type (QT, BT, TT, etc.), an indicator of an inter-component prediction mode, index information, etc.

A prediction unit 230 and 235 may generate a prediction block based on information related to prediction block generation provided in an entropy decoding unit 210 and pre-decoded block or picture information provided in a memory 245.

A prediction unit 230 and 235 may include a prediction unit determination unit, an inter prediction unit and an intra prediction unit. A prediction unit determination unit may receive a variety of information such as prediction unit information, information related to an intra prediction mode of an intra prediction method, information related to motion prediction of an inter prediction method, an indicator of an inter-component prediction mode, index information, etc. which are input from an entropy decoding unit 210, classify a prediction unit in a current coding unit (CU) and determine whether a prediction unit performs inter prediction or intra prediction. An inter prediction unit 230 may perform inter prediction for a current prediction unit based on information included in at least one picture of a previous picture or a subsequent picture of a current picture that a current prediction unit is included by using information necessary for inter prediction in a current prediction unit provided by an encoding device. Alternatively, inter prediction may be performed based on information of some regions which are pre-reconstructed in a current picture that a current prediction unit is included. For it, part of the pre-reconstructed regions may be added to a reference picture list.

To perform inter prediction, whether a motion prediction method in a prediction unit included in a corresponding coding unit is a skip mode, a merge mode, a AMVP mode or a current picture reference mode may be determined based on a coding unit.

An intra prediction unit 235 may generate a prediction block based on pixel information in a current picture. When a prediction unit is a prediction unit which performed intra prediction, intra prediction may be performed based on an indicator and index information of an inter-component prediction mode, prediction mode information, etc. in a prediction unit provided by an encoding device. An intra prediction unit 235 may include an adaptive intra smoothing (AIS) filter, a reference pixel interpolation unit and a DC filter. As a part performing filtering for a reference pixel of a current block, an AIS filter may be applied by determining whether a filter is applied according to a prediction mode in a current prediction unit. AIS filtering may be performed for a reference pixel of a current block by using a prediction mode in a prediction unit and AIS filter information provided by an encoding device. When a prediction mode of a current block is a mode which does not perform AIS filtering, an AIS filter may not be applied.

When a prediction mode in a prediction unit is a prediction unit in which intra prediction is performed based on a pixel value interpolating a reference pixel, a reference pixel interpolation unit may interpolate a reference pixel to generate a reference pixel in a pixel unit which is equal to or less than an integer value. When a prediction mode in a current prediction unit is a prediction mode which generates a prediction block without interpolating a reference pixel, a reference pixel may not be interpolated. A DC filter may generate a prediction block through filtering when a prediction mode of a current block is a DC mode.

A reconstructed block or picture may be provided to a filter unit 240. A filter unit 240 may include a deblocking filter, an offset modification unit and an ALF.

Information on whether a deblocking filter is applied to a corresponding block or picture and information on whether a strong filter or a weak filter is applied when a deblocking filter is applied may be provided by an encoding device. A deblocking filter of a decoding device may receive information related to a deblocking filter provided by an encoding device and perform deblocking filtering for a corresponding block in a decoding device.

An offset modification unit may perform offset modification on a reconstructed image based on a type of offset modification, offset value information, etc. applied to an image in encoding.

An ALF may be applied to a coding unit based on information on whether an ALF is applied, ALF coefficient information, etc. provided by an encoder. Such ALF information may be provided by being included in a specific parameter set.

A memory 245 may store a reconstructed picture or block for use as a reference picture or a reference block and also provide a reconstructed picture to an output unit.

FIG. 3 is a block diagram of inter-component prediction encoding/decoding related to the present disclosure.

In reference to FIG. 3, an encoding and decoding method and device according to the present disclosure may include deriving an inter-component prediction mode S310, configuring a reference sample S320, deriving a linear prediction model S330 and generating an inter-component prediction sample S340 to perform inter-image component prediction encoding or decoding for a current block.

On the other hand, in the after-described embodiment, encoding information may include a block size/shape, availability of a block, a division type, the number of divisions, a component type, a prediction mode, information on an intra prediction mode, an inter mode, motion information, a transform type, a transform skip mode, information on a non-zero residual coefficient, a scan order, a color format, in-loop filter information, etc. The block size may be expressed as any one of a width or a height, the minimum value/the maximum value of a width and a height, a sum of a width and a height, the number of samples belonging to a block, etc. Availability of the block may be determined by considering a block position, a range of a parallel processing region, a decoding order, etc. The prediction mode may mean information representing an intra mode or an inter mode. Information on the intra prediction mode may include information on whether an intra prediction mode is a non-directional mode, whether an intra prediction mode is a vertical/horizontal mode, directivity of an intra prediction mode, the number of intra prediction modes predefined in an encoding/decoding device, etc. The inter mode may mean information representing a merge/skip mode, an AMVP mode or a current picture reference mode. The current picture reference mode means a method in which a current block is predicted by using a pre-reconstructed region of a current picture. The current picture may be a picture to which the current block belongs. The current picture may be added to a reference picture list for inter prediction and the current picture may be arranged after a short-term reference picture or a long-term reference picture in a reference picture list. The motion information may include a prediction direction flag, a motion vector, a reference picture index, etc.

In encoding or decoding, an input and reconstructed image may have M components (channels). A reconstructed image may include any one of an image predicted by a prediction unit, an image that a residual image is added/subtracted to/from a predicted image and an image that an in-loop filter is applied after addition/subtraction. M may be an integer such as 1, 2, 3, 4, or more. A value of M may be a fixed value which is pre-defined in an encoder/a decoder or may be variably or selectively determined based on encoding information.

For example, an input and reconstructed image may be a gray image having 1 component.

Alternatively, an input and reconstructed image may be a RGB image having 3 components. In this case, a first component may be a R image, a second component may be a G image and a third component may be a B image. Alternatively, an input and reconstructed image may be a YUV image having 3 components. In this case, a first component may be a Y image, a second component may be a U image and a third component may be a V image. Alternatively, an input and reconstructed image may be a RGB+depth image having 4 components. An input and reconstructed image may be a YUV+depth image having 4 components. Alternatively, a component of an input image and a reconstructed image may be subsampled. An input and reconstructed image may be RGB 4:4:4. An input and reconstructed image may be YUV 4:4:4. An input and reconstructed image may be YUV 4:2:2. An input and reconstructed image may be YUV 4:2:0.

Inter-image component prediction may derive a linear model by using a predetermined reference sample and generate a prediction signal of a chroma component from a decoding signal of a luma component by using this linear model. Herein, a reference sample may be (1) a fixed position which is pre-promised in an image encoder/decoder. Alternatively, (2) a reference sample may be variably determined based on encoding information or (3) information for specifying a reference sample may be encoded in an encoder and signaled. A reference sample may be determined based on a combination of at least two of the above-described (1) to (3) embodiments. Through the above-described embodiment, a position, the number, a range, a length, etc. of the reference sample may be determined.

In addition, when a linear model is derived, a relationship between a luma signal and a chroma signal of specific samples may be also used. In addition, transmission of index information on a variety of inter-component prediction modes may be necessary.

In deriving an inter-component prediction mode S310, an inter-component prediction mode of a current block may be derived by using at least one or more methods of configuring an inter-component prediction mode list, entropy encoding and decoding of prediction mode information and deriving an inter-component prediction mode in a decoder.

Concretely, in deriving an inter-image component prediction mode for a current block, an inter-component prediction mode list may be configured. The inter-component prediction mode list may be configured by an intra prediction mode list. Alternatively, an inter-component prediction mode list may be configured in a table shape which is pre-defined in an encoding/decoding device.

An inter-component prediction mode list may include a positive number, N inter-component prediction modes. N may be an integer such as 1, 2, 3, 4, or more. A value of N may be a fixed value which is pre-defined in an encoder/a decoder or may be variably or selectively determined based on the above-described encoding information. For example, N inter-component prediction modes may be selectively or variably determined according to a position, a size/a shape, availability, or a division technique, etc. of a current block and/or a peripheral block. Alternatively, the N may be encoded in an encoder and signaled. The signaling may be performed in a level of at least one of a video sequence, a picture, a slice, a tile or a predetermined partial region (e.g., CTU row, CTU, CU, PU, TU)

When N is 3, an inter-component prediction mode list may include 3 inter-component prediction modes. When each inter-component prediction mode is referred to as a first, second, third inter-component prediction mode, a first inter-component prediction mode may be classified as a prediction mode using a left peripheral block, a second inter-component prediction mode may be classified as a prediction mode using a top peripheral block and a third inter-component prediction mode may be classified as a prediction mode using left and top peripheral blocks. When N is less than 3, an inter-component prediction mode list may be configured with some of the first, second and third inter-component mode.

For example, an inter-component prediction mode list having 3 inter-component prediction modes may be configured as in Table 1.

TABLE 1

| Mode | Binary Symbol | |
|---|---|---|
| First Inter-component Prediction Mode | 0 | |
| Second Inter-component Prediction Mode | 1 | 1 |
| Third Inter-component Prediction Mode | 1 | 0 |

Alternatively, an inter-component prediction mode list having 4 inter-component prediction modes may be configured as in Table 2.

TABLE 2

| Mode | Binary Symbol | |
|---|---|---|
| First Inter-component Prediction Mode | 0 | 0 |
| Second Inter-component Prediction Mode | 0 | 1 |
| Third Inter-component Prediction Mode | 1 | 0 |
| Fourth Inter-component Prediction Mode | 1 | 1 |

In deriving an inter-image component prediction mode for a current block, entropy encoding and/or decoding for prediction mode information may be performed. Entropy encoding and decoding for an indicator of an inter-component prediction mode may be performed. When an indicator is 'a first value', inter-component prediction may be performed. A first value may be an integer such as 0, 1, or more. On the other hand, when an indicator is 'a second value', inter-component prediction may not be performed. Herein, a second value may be an integer different from a first value.

Entropy encoding and decoding for index information may be performed. Herein, the index information may include information specifying at least one inter-component prediction mode of an inter-component prediction mode list.

An indicator of an inter-component prediction mode may be index information. For example, when inter-component prediction mode list index information is first index information specifying one mode of an inter-component prediction mode list, it may mean that an indicator of an inter-component prediction mode is a first value.

Entropy encoding and/or decoding may be performed by generating a binary symbol based on the indicator or the index information. A binary symbol may be generated by a binarization method. For a binarization method, truncated unary binarization, fixed length binarization, truncated Rice (TR) binarization, k-th order Exp-Golomb binarization, or fixed-length binarization, etc. may be used. The binarization method may be selected by a pre-promised fixed binarization method or may be variably or adaptively selected based on the above-described encoding information.

As in Table 1, in case of index information of 3 inter-component prediction modes, a binary symbol may be generated by using truncated unary binarization and entropy encoding and decoding for a generated binary symbol may be performed.

Alternatively, as in Table 2, in case of index information of 4 inter-component prediction modes, a binary symbol may be generated by using fixed length binarization and entropy encoding and decoding for a generated binary symbol may be performed.

Entropy encoding and decoding for a generated binary symbol may be performed by at least one or more methods of CABAC, CAVLC, Huffman encoding and bypass encoding.

In deriving an inter-image component prediction mode for a current block, an inter-component prediction mode may be derived in a decoder.

In deriving an inter-component prediction mode in a decoder, a decoder may select one of a plurality of inter-component prediction modes. The plurality of inter-component prediction modes may be included in the above-described inter-component prediction mode list.

Herein, a region of a reference sample of a plurality of inter-component prediction modes may be different from each other. When a region of the reference sample is different, it may mean that at least one or more of a position, the number, a size or a shape of a reference sample or the number or a range of sample lines belonging to a region of a reference sample may be different. A size and a shape of the reference sample may be expressed as a width, a height, a ratio of a width and a height, a sum of a width and a height, or a multiplication of a width and a height, etc.

For example, in reference to FIG. 4, 3 inter-component prediction modes may be pre-defined and reference sample regions of the inter-component prediction modes may be different from each other. A first inter-component prediction mode may be a mode using left and top reference sample regions, a second inter-component prediction mode may be a mode using a left reference sample region and a third inter-component prediction mode may be a mode using a top reference sample region. A first inter-component prediction mode may further include a top-left reference sample region. A length of a left reference sample region according to a second inter-component prediction mode may be the same as or longer than a length of a left reference sample region according to a first inter-component prediction mode. In other words, a left reference sample region according to a second inter-component prediction mode may further include an additional region with a predetermined length in addition to a left reference sample region according to a first inter-component prediction mode. Herein, a predetermined length may be determined based on whether a sample in a top-right region adjacent to a current/corresponding block is available. Similarly, a length of a top reference sample region according to a third inter-component prediction mode may be the same as or longer than a length of a top reference sample region according to a first inter-component prediction mode. In other words, a top reference sample region according to a third inter-component prediction mode may further include an additional region with a predetermined length in addition to a top reference sample region according to a first inter-component prediction mode and a predetermined length may be determined based on whether a sample in a bottom-left region adjacent to a current/corresponding block is available.

One of a plurality of inter-component prediction modes may be selected as a pre-promised fixed mode or may be variably selected based on the above-described encoding information.

Alternatively, the selection may be performed based on at least one of the indicator or the index information. For example, a mode specified by index information may be selected as an inter-component prediction mode. In this case, an encoding device selects the optimum mode of a plurality of inter-component prediction modes, and the selection may be performed by cost comparison between a reference sample of a corresponding block of a first component and a reference sample of a current block of a second component as shown in FIG. 4. In this case, cost calculation may be one of SAD (Sum of Absolute Differences), SATD (Sum of Absolute Transformed Differences), MR-SAD (Mean Removed-SAD), and SSIM (Structual Similarity).

For example, an encoding/decoding device may select an inter-component prediction mode with the smallest MR-SAD among a positive integer, N inter-component prediction modes. Alternatively, an inter-component prediction mode with the smallest SAD among a positive integer, N inter-component prediction modes may be selected. Alternatively, an inter-component prediction mode with the smallest SATD among a positive integer, N inter-component prediction modes may be selected.

In deriving an inter-component prediction mode in a decoder, a decoding device may perform inter-component prediction by using a selected inter-component prediction mode. Whether inter-component prediction is performed may be determined by an indicator. Herein, an indicator, as described above, may become index information of an inter-component prediction mode. For example, when index information for an inter-component prediction mode list plays a role as an indicator, inter-component prediction may be performed by a mode specified by index information.

In performing inter-image component prediction encoding and/or decoding for a current block, configuring a reference sample S320 may determine a reference sample for inter-component prediction by using at least one or more methods of a single reference sample set, multiple reference sample sets or downsampling.

In inter-component prediction, when it is assumed that a component to be used for prediction is a first component and a component to be predicted is a second component, a corresponding block of a first component may be used to predict a current block of a second component. For example, when a first component is a luma component and a second component is a chroma component, a corresponding block of a first component may be a luma block corresponding to a current block (a chroma block).

A reference sample may be configured with one or a plurality of sample lines or may have a shape such as a quadrangle, a triangle, a diamond shape, or a trapezoidal shape, etc. When a reference sample is configured with a plurality of sample lines, the number of sample lines may be 2, 3, 4, or more. The number may be a pre-defined fixed value or may be variably determined based on the above-described encoding information.

FIG. 8 shows that a reference sample is formed in a shape of a sample line (a reference sample set). In reference to FIG. 8, for inter-component prediction, a current block may selectively use at least one of first to fourth reference samples neighboring in a left/top direction. Alternatively, at least one of first to fourth reference samples neighboring in any one of a left or top direction may be selectively used by classifying a reference sample into the left and the top.

The selection may be determined by a pre-promised fixed position (first and second reference samples, first and third reference samples, etc.) or may be variably determined according to the above-described encoding information. For example, according to availability of a peripheral block, there may be a limit that only a reference sample excluding a reference sample adjacent to the left is used when a left peripheral block is unavailable. For example, there may be a limit that only a reference sample excluding a reference sample adjacent to the top is used when a top peripheral block is unavailable.

Alternatively, among first to fourth reference samples, the number of available reference samples in a left direction may be different from the number of available reference samples in a top direction. For example, there may be a limit that n reference samples (e.g., first to third reference samples) are used in a left direction and m reference samples (e.g., a first reference sample) are used in a top direction. Herein, n may not be limited to 3 and may be an integer such as 1, 2, 4, or more. m may not be limited to 1 and may be an integer such as 2, 3, 4, or more. But, n may be greater than m or inversely, m may be set to be greater than n. A reference sample set may be a reference sample in a pre-defined region used for inter-component prediction. A reference sample set may include a peripheral block of at least one of a corresponding block of a first component or a current block of a second component. A peripheral block may include at least one of the top, the bottom, the left, the right, the bottom-left, the top-left, the top-right or the bottom-right of a corresponding block of a first component or a current block of a second component. A shape of a reference sample set may be configured with one or a plurality of sample lines or may have a shape such as a quadrangle, a triangle, a diamond shape, or a trapezoidal shape, etc. When being configured with a plurality of sample lines, sample lines may be adjacent each other or may have a predetermined distance, t. t may be a natural number such as 1, 2, 3, 4, or more. t may be a pre-promised fixed value or may be variably determined based on the above-described encoding information.

When a reference sample is configured by a reference sample set, all or part of samples of a reference sample set may be used as a reference sample or a value filtering all or part of samples of a reference sample set may be used as a reference sample. In this case, filtering may be performed based on at least one of an interpolation filter, a weighted average filter, a downsampling filter.

When only some samples of a reference sample set are used, the some samples may be selected by a pre-promised fixed method or may be selected based on the above-described encoding information. For example, a determination may be made by a ratio of a width or a height of a corresponding block of a first component and a current block of a second component or a ratio of a block size, etc. Concretely, when the ratio is 1:r or r:1, only some samples having a distance in a sample interval unit of r or r/2 in a reference sample set may be used to configure a reference sample.

When a reference sample in specific inter-image component prediction for a current block is configured, a reference sample may be configured by using a single reference sample set.

A single reference sample set may mean that one reference sample set is used for specific inter-component prediction.

A peripheral region of at least one of a corresponding block of a first component or a current block of a second component may be a single reference sample set.

For example, a position of a reference sample shown in FIG. 5(GA) may be a single reference sample set. Alternatively, a position of a reference sample shown in FIG. 6(GA) may be a single reference sample set. Alternatively, a position of a reference sample shown in FIG. 7(GA) may be a single reference sample set.

A peripheral region separated by a certain distance from at least one of a corresponding block of a first component or a current block of a second component may be a single reference sample set.

For example, a position of a reference sample shown in FIG. 5(NA) may be a single reference sample set. Alternatively, a position of a reference sample shown in FIG. 6(NA) may be a single reference sample set. Alternatively, a position of a reference sample shown in FIG. 7(NA) may be a single reference sample set.

When a reference sample in specific inter-image component prediction for a current block is configured, a reference sample may be configured by using a plurality of reference sample sets. In this case, a plurality of reference sample sets may mean that two or more reference sample sets are used for specific inter-component prediction.

Herein, when a reference sample is configured by using a plurality of reference sample sets in specific inter-component prediction, at least one of a plurality of reference sample sets may be selectively used. A pre-promised fixed reference sample set may be selected or it may be adaptively selected based on the above-described encoding information. For example, a plurality of reference sample sets may be adaptively selected according to a condition such as a block size, a position of an intra prediction reference sample of a first component corresponding block, etc.

For example, when there are 2 reference sample sets of specific inter-component prediction and they correspond to reference sample sets at positions of FIG. 5(GA) and FIG. 5(NA), respectively, a reference sample set close to a position of an intra prediction reference sample of a first component corresponding block may be selected. In other words, when an intra prediction reference sample of a first component corresponding block is a second reference sample shown in FIG. 8, a reference sample at a position of FIG. 5(NA) may be configured in specific inter-component prediction.

For example, when there are 2 reference sample sets of specific inter-component prediction and they correspond to reference sample sets at positions of FIG. 6(GA) and FIG. 7(GA), respectively, a reference sample set at a position of FIG. 6(GA) may be selected when a width of a block is greater than a height, and otherwise, a reference sample set at a position of FIG. 6(GA) may be selected.

For example, when there are 2 reference sample sets of specific inter-component prediction and they correspond to reference sample sets at positions of FIG. 6(GA) and FIG.

7(GA), a reference sample set at a position of FIG. 6(GA) may be selected when a width of a block is greater than a height, and otherwise, a reference sample set at a position of FIG. 7(GA) may be selected. Conversely, when a width of a block is less than a height, a reference sample set (a left reference sample set) at a position of FIG. 7(GA) may be selected and otherwise, a reference sample set (a top reference sample set) at a position of FIG. 6(GA) may be selected. When a width of a block is the same as a height, left and top reference sample sets may be used.

When a reference sample in inter-image component prediction for a current block is configured, a reference sample may be configured by using downsampling.

In this case, downsampling may be performed for a reference sample of a first component when a size of a corresponding block of a first component is not the same as a size of a current block of a second component.

The downsampling may be performed by applying a downsampling filter to a reference sample at a specific position. Herein, a reference sample at a specific position may include a plurality of reference samples positioned at a predetermined inter-sample interval (k) from a reference sample at a position of a start point. The inter-sample interval (k) may include a natural number such as 1, 2, 3, 4, or more.

When an inter-component prediction mode is a mode which uses top and left reference samples (hereinafter, referred to as a LT mode), a position of a start point may be defined on the top and the left, respectively. In this case, a downsampling filter may be applied to one or more reference samples positioned at a predetermined inter-sample interval in a right direction from a reference sample at a position of a top start point. Similarly, a downsampling filter may be applied to one or more reference samples positioned at a predetermined intersample interval in a bottom direction from a reference sample at a position of a left start point.

When an inter-component prediction mode is a mode which uses a top reference sample (hereinafter, referred to as a T mode), a downsampling filter may be applied to one or more reference samples positioned at a predetermined inter-sample interval in a right direction from a reference sample at a position of a top start point. Similarly, when an inter-component prediction mode is a mode which uses a left reference sample (hereinafter, referred to as a L mode), a downsampling filter may be applied to one or more reference samples positioned at a predetermined intersample interval in a bottom direction from a reference sample at a position of a left start point.

For example, it is assumed that a position of a top-left sample of a first component block is (0,0). In this case, when a coordinate of a reference sample at a position of a start point is (1, −1) and k is 2, a reference sample at the specific position may include a sample having a coordinate such as (1,−1), (3,−1), (5,−1), (7,−1), etc. Alternatively, when a coordinate of a reference sample at a position of a start point is (−1, 2) and k is 4, a reference sample at the specific position may include a sample having a coordinate such as (−1,2), (−1,6), etc.

At least one of a position of the start point, an inter-sample interval or the number of reference samples at a specific position to which a downsampling filter is applied may be a fixed value which is pre-promised in an encoding/decoding device or may be variably determined based on the above-described encoding information. Concretely, it may be determined by at least one of a size of a component block, availability of a peripheral block of a component block or an inter-component prediction mode. A size of the block may be expressed as any one of a width or a height, the minimum value/the maximum value of a width and a height, a sum of a width and a height, the number of samples belonging to a block, etc.

For example, in case that a width (or a height) of a component block is 4, a reference sample to be downsampled may include all reference samples positioned at the top (or the left) of a component block when at least one of left and top peripheral blocks of a component block is not available or an inter-component prediction mode is a T mode (or a L mode). On the other hand, when left and top peripheral blocks of a component block are available and an inter-component prediction mode is a LT mode, a reference sample to be downsampled may include a reference sample at a position of a start point and one or more reference samples positioned at a predetermined inter-sample interval from a reference sample at a position of a start point. Herein, when it is assumed that a position of a top-left sample of a first component block is (0,0), a position of a top start point may be any one of (1,−1), (2,−1), (3,−1) or (4,−1) (or, a position of a left start point is any one of (−1,1), (−1,2), (—1,3) or (−1,4)) and an inter-sample interval may be an integer such as 2, 3, 4, 5 or more in a right direction (or, in a bottom direction). But, it is not limited thereto and a x-coordinate of a position of a start point may be an integer which is greater than or the same as 5.

For example, in case that a width (or a height) of a block is 8 or more, a reference sample to be downsampled may include a reference sample at a position of a start point and one or more reference samples positioned at a predetermined inter-sample interval from a reference sample at a position of a start point when at least one of left and top peripheral blocks of a component block is not available or an inter-component prediction mode is a T mode (or a L mode). Herein, when it is assumed that a position of a top-left sample of a first component block is (0,0), a position of a start point may be any one of (1,−1), (2,−1), (3,−1) or (4,−1) (or, any one of (−1,1), (−1,2), (−1,3) or (−1,4)) and an inter-sample interval may be an integer such as 2, 3, 4, 5 or more. But, it is not limited thereto and a x-coordinate of a position of a start point may be an integer which is greater than or the same as 5.

Alternatively, when left and top peripheral blocks of a component block are available and an inter-component prediction mode is a LT mode, a reference sample to be downsampled may include a reference sample at a position of a start point and one or more reference samples positioned at a predetermined inter-sample interval from a reference sample at a position of a start point. Herein, when it is assumed that a position of a top-left sample of a first component block is (0,0), a position of a top start point may be any one of (2,−1), (3,−1) or (4,−1), a position of a left start point may be any one of (−1,2), (−1,3) or (−1,4) and an inter-sample interval may be an integer such as 4, 5 or more. But, it is not limited thereto and at least one of a x-coordinate or a y-coordinate of a position of a start point may be an integer which is greater than or the same as 5.

A position of a start point and/or an inter-sample interval in a T mode (or a L mode) may be set differently from a LT mode. For example, a position of a start point of a T mode (or a L mode) may be closer to a position of a top-left sample of a first component block than a position of a start point in a LT mode. An inter-sample interval of a T mode (or a L mode) may be less than an inter-sample interval in a LT mode. Alternatively, conversely, a position of a start point of a T mode (or a L mode) may be farther from a position of a top-left sample of a first component block than a position of a start point in a LT mode and an inter-sample interval of a T mode (or a L mode) may be greater than an inter-sample interval of a LT mode. In a LT mode, an inter-sample interval of a top reference sample may be determined differently from an inter-sample interval of a left reference sample. For example, when a width of a component block is greater than a height, an inter-sample interval of a top reference sample may be set to be greater than an inter-sample interval of a left reference sample.

Through the above-described method, a position of a top/left reference sample to which a downsampling filter is applied may be specified and hereinafter, a concrete downsampling method will be described.

Downsampling may be performed by using a sample to be downsampled (hereinafter, a target sample) and one or more samples neighboring a target sample (hereinafter, a neighboring sample). In other words, a target sample may mean a reference sample specified according to the above-described method. The neighboring sample may include a sample neighboring the target sample in at least one direction of a vertical, horizontal or diagonal direction. Herein, the neighboring sample may include a sample separated by a determined distance k as well as samples which are adjacent and connected to the target sample. k may include an integer such as 1, 2, 3, 4, or more. k may be a pre-promised fixed value or may be variably determined based on encoding information. For example, when a ratio of a size of a first component corresponding block and a size of a second component current block is r:1, a predetermined distance k may be r or r/2. The number of the neighboring samples may be a natural number such as 1, 2, 3, 4, 5, 6, or more. The number may be a pre-promised fixed value or may be variably determined based on encoding information.

Downsampling may be performed by at least one of a weighted average value, an average value, the maximum value, the minimum value, a mode or a filtering value of samples used for the downsampling. Herein, a weighted average value may mean a value obtained by multiplying each sample by a weight and averaging them.

A weight to be applied to each sample may be determined based on the number of neighboring samples to be used for downsampling.

For example, when 1 neighboring sample is used, a weighted average of a target sample and a neighboring sample may be performed at a weight ratio of 1:1. Alternatively, when 2 neighboring samples are used, a weighted average of a target sample and neighboring samples may be performed at a weight ratio of 2:1. Alternatively, when 4 neighboring samples are used, a weighted average of a target sample and neighboring samples may be performed at a weight ratio of 4:1. Alternatively, when 5 neighboring samples are used, for a weighted average, a weight of a target sample may be 2 and a weight of neighboring samples may be at least one of 1 or 2. In this case, a weight of neighboring samples may be different according to a position of a target sample.

Hereinafter, a downsampling method according to the number of neighboring samples is described.

1. First Downsampling Method

First downsampling is a case in which 4 neighboring samples are used and it may be performed by a weighted average value of 4 neighboring samples and a target sample. Herein, a ratio of weights of a target sample and a neighboring sample may be 4:1. The 4 neighboring samples may include samples which are adjacent in a top, bottom, left and right direction from a target sample. Herein, neighboring samples may be adjacent to a target sample or may be positioned at a position separated by 1 from a target sample in an interval of a sample unit.

First downsampling may be performed by using the following Equation 1.

$$\begin{aligned}\text{Ds\_Sample}[x][y] = {} & (1*\text{Sample}[SubWidth*x]\,[SubHeight*y-1] + \\ & 1*\text{Sample}[SubWidth*x-1]\,[SubHeight*y] + \\ & 4*\text{Sample}[SubWidth*x]\,[SubHeight*y] + \\ & 1*\text{Sample}[SubWidth*x+1]\,[SubHeight*y] + \\ & 1*\text{Sample}[SubWidth*x]\,[SubHeight*y+1] + 4) \gg 3\end{aligned} \qquad \text{[Equation 1]}$$

Herein, Ds_Sample may be a downsampled sample, Sample may be a sample to be used for downsampling, x and y may be a coordinate representing a position of a sample and SubWidth and SubHeight may be values determined by a chroma format. For example, when a chroma format is 4:2:0, each of SubWidth and SubHeight may have a value of 2 and when a chroma format is 4:2:2, SubWidth may have a value of 2 and SubHeight may have a value of 1. In addition, for other cases except for a case when a chroma format is 4:2:0, 4:2:2, each of SubWidth and SubHeight may have a value of 1.

2. Second Downsampling Method

Second downsampling is a case in which 2 neighboring samples are used and it may be performed by a weighted average value of 2 neighboring samples and a target sample. Herein, a ratio of weights of a target sample and a neighboring sample may be 2:1. The 2 neighboring samples may be neighboring to a target sample in a vertical direction or a horizontal direction. Concretely, in case of being neighboring in a vertical direction, neighboring samples may be at top and bottom positions of a target sample, respectively, and in case of being neighboring in a horizontal direction, neighboring samples may be at left and right positions of a target sample, respectively. In this case, neighboring samples may be adjacent to a target sample or may be positioned at a position separated by 1 from a target sample in an interval of a sample unit.

When neighboring samples are neighboring in a vertical direction, second downsampling may be performed by using Equation 2.

$$\begin{aligned}\text{Ds\_Sample}[x][y] = {} & (1*\text{Sample}[SubWidth*x][SubHeight*y-1] + \\ & 2*\text{Sample}[SubWidth*x]\,[SubHeight*y] + \\ & 1*\text{Sample}[SubWidth*x]\,[SubHeight*y+1] + 2) \gg 2\end{aligned} \qquad \text{[Equation 2]}$$

In this case, as Ds_Sample, Sample, x,y, SubWidth, SubHeight are the same as described above, a detailed description is omitted.

When neighboring samples are neighboring in a horizontal direction, second downsampling may be performed by using Equation 3.

$$\text{Ds\_Sample}[x][y] = \qquad \text{[Equation 3]}$$

-continued $$(1*\text{Sample}[SubWidth*x-1][SubHeight*y] + 2*\text{Sample}[SubWidth*x][SubHeight*y] + 1*\text{Sample}[SubWidth*x+1][SubHeight*y] + 2) \gg 2$$

In this case, as Ds_Sample, Sample, x,y, SubWidth, SubHeight are the same as described above, a detailed description is omitted.

3. Third Downsampling Method

Third downsampling is a case in which 5 neighboring samples are used and it may be performed by a weighted average value of 5 neighboring samples and a target sample. Herein, a weight of a target sample may be 2 and a weight of a neighboring sample may be 2 or 1. In this case, neighboring samples may be adjacent to a target sample or may be positioned at a position separated by 1 from a target sample in an interval of a sample unit.

Third downsampling may be performed by using the following Equation 4.

[Equation 4]

$$\text{Ds\_Sample}[x][y] = (1*\text{Sample}[SubWidth*x-1][SubHeight*y] + 1*\text{Sample}[SubWidth*x-1][SubHeight*y+1] + 2*\text{Sample}[SubWidth*x][SubHeight*y] + 2*\text{Sample}[SubWidth*x][SubHeight*y+1] + 1*\text{Sample}[SubWidth*x+1][SubHeight*y] + 1*\text{Sample}[SubWidth*x+1][SubHeight*y+1] + 4) \gg 3$$

In this case, as Ds_Sample, Sample, x,y, SubWidth, SubHeight are the same as described above, a detailed description is omitted.

4. Fourth Downsampling Method

Fourth downsampling is a case in which 1 neighboring sample is used and it may be performed by a weighted average value of 1 neighboring sample and a target sample. Herein, a weight of a target sample and a neighboring sample may be 1:1.

The 1 neighboring sample may be neighboring in a vertical direction or a horizontal direction based on a target sample. Concretely, in case of being neighboring in a vertical direction, a neighboring sample may be at a bottom position of a target sample and in case of being neighboring in a horizontal direction, a neighboring sample may be at a right position of a target sample. In this case, neighboring samples may be adjacent to a target sample or may be positioned at a position separated by 1 from a target sample in an interval of a sample unit.

When a neighboring sample is neighboring in a vertical direction, fourth downsampling may be performed by using the following Equation 5.

[Equation 5]

$$\text{Ds\_Sample}[x][y] = (1*\text{Sample}[SubWidth*x][SubHeight*y] + 1*\text{Sample}[SubWidth*x][SubHeight*y+1] + 1) \gg 1$$

In this case, as Ds_Sample, Sample, x,y, SubWidth, SubHeight are the same as described above, a detailed description is omitted.

When a neighboring sample is neighboring in a horizontal direction, fourth downsampling may be performed by using Equation 6.

[Equation 6]

$$\text{Ds\_Sample}[x][y] = (1*\text{Sample}[SubWidth*x][SubHeight*y] + 1*\text{Sample}[SubWidth*x+1][SubHeight*y] + 1) \gg 1$$

In this case, as Ds_Sample, Sample, x,y, SubWidth, SubHeight are the same as described above, a detailed description is omitted.

As described above, downsampling may be performed when a size of a corresponding block of a first component is not the same as a size of a current block of a second component.

On the other hand, based on a predetermined flag, at least one of the above-described downsampling methods may be selectively used. Herein, a flag may represent whether a sample of a second component has a position shifted below by 0.5 in a sample unit of a first component from a sample position of a corresponding first component. The flag may be derived in a decoding device based on encoding information or may be encoded in an encoding device and signaled. Hereinafter, a case in which a flag is a first value is referred to as a first CASE and otherwise, it is referred to as a second CASE.

Per each CASE, based on at least one of a CTU (coding tree unit) related parameter or availability of a peripheral block, at least one of first to fourth downsampling methods may be selectively used.

When a CTU related parameter is 'a first value', it may mean any one of (1) a case in which a target sample belongs to a CTU different from a component block or a peripheral block of a component block, (2) a case in which a neighboring sample or a target sample is positioned on a CTU boundary, or (3) a case in which a neighboring sample or a target sample is separated from a CTU boundary by 1 at an interval of a sample unit. Herein, a first value may be an integer such as 0, 1, or more. For example, when the CTU related parameter is a first value, a target sample may belong to a CTU different from a component block.

For example, when it is a first CASE and a CTU related parameter is a first value, a second downsampling method may be applied. But, when left and top peripheral blocks are not available, downsampling may not be applied.

When it is a first CASE and when a CTU related parameter is not a first value, a first downsampling method may be applied if left and top peripheral blocks are available, and a fourth downsampling method may be applied or a downsampling method according to the following Equation 7 may be applied if left and top peripheral blocks are not available.

[Equation 7]

$$\text{Ds\_Sample}[x][y] = (1*\text{Sample}[SubWidth*x][SubHeight*y+1] + 2*\text{Sample}[SubWidth*x][SubHeight*y] + 1*\text{Sample}[SubWidth*x][SubHeight*y+1] + 2) \gg 2$$

According to Equation 7, a weighted average value may be calculated by adding a value of 1 neighboring sample two times. Herein, as Ds_Sample, Sample, x,y, SubWidth, SubHeight are the same as described above, a detailed description is omitted.

When it is a second CASE and a CTU related parameter is a first value, second downsampling may be applied. But, when left and top peripheral blocks are not available, downsampling may not be applied.

When it is a second CASE and a CTU related parameter is not a first value, third downsampling may be applied if left and top peripheral blocks are available, and fourth downsampling may be applied if left and top peripheral blocks are not available.

Per each CASE, at least one of first to fourth downsampling methods may be selectively used based on at least one of whether a target sample is positioned on a block boundary or availability of a peripheral block.

For example, when it is a first CASE and a target sample is not positioned on a block boundary, first downsampling may be applied.

When it is a first CASE and a target sample is positioned on a block boundary, a first or second downsampling method may be applied or downsampling may not be applied. Alternatively, concretely, when left and top peripheral blocks of a component block are available, a first downsampling method may be applied, and when only any one of left or top peripheral block of a component block is available, a second downsampling method may be applied, and when left and top peripheral blocks of a component block are not available, downsampling may not be applied.

When it is a second CASE and a target sample is not positioned on a block boundary, a third downsampling method may be applied.

When it is a second CASE and a target sample is positioned on a block boundary, a third or fourth downsampling method may be applied or downsampling may not be applied. Concretely, when a left peripheral block of a component block is available, a third downsampling method may be applied and when a left peripheral block of a component block is not available, a fourth downsampling method may be applied.

Downsampling may be performed by using a N-tap filter. Herein, N may be an integer such as 2, 3, 4, 5, 6, or more. For example, downsampling may be performed by using a 3-tap filter. Alternatively, downsampling may be performed by using a 6-tap filter.

When downsampling is performed, a filter may be differently applied on a boundary of at least one of a CTU (coding tree unit), a slice and a tile. For example, when a top boundary of a block coincides with a CTU boundary, a first filter may be applied to a top boundary of a block and otherwise, a second filter may be applied.

The first filter and second filter may have a different downsampling method (a weighted average value, an average value, the maximum value, the minimum value, a mode, or a filtering value). In addition, when first and second filters are based on a weighted average value, at least one of the number or a weight of neighboring samples may be different. In addition, when first and second filters are based on a n-tap filter, at least one of the number of taps, a coefficient or strength of a filter may be different. Concretely, when the first filter is a n-tap filter and a second filter means a m-tap filter, n may be less than or the same as m. For example, n may be 3 and m may be 6.

When a reference sample is configured in inter-image component prediction for a current block, a downsampled reference sample may be used. A reference sample to be downsampled may be configured by using a single reference sample set or multiple reference sample sets.

Deriving a linear prediction model S330 may derive a linear prediction model in an inter-component prediction mode by using at least one or more methods of deriving a single linear model, multiple linear models and an outlier exclusion linear model in performing inter-image component prediction encoding and decoding for a current block.

Herein, a linear model may have a relationship as in the following Equation 8. A linear prediction model in which a prediction block of a current block of a second component is generated from a decoded block of a corresponding block of a first component may be derived by using the linear model.

Herein, a decoded block may mean a block which is already encoded (or, decoded) in an encoding (or, decoding) process for a current block.

$$Pred_{c2} = \alpha * Rec_{c1} + \beta \quad \text{[Equation 8]}$$

In the Equation, PredC2 is a prediction block of a current block of a second component, PredC1 is a decoded block of a corresponding block of a first component and α and β are parameters of a linear model.

Herein, parameters of a linear model, α and β, may be derived by using at least one of a reference sample of a corresponding block of a first component or a reference sample of a current block of a second component.

In this case, a linear regression equation may be used to derive parameters of a linear model and may be derived by the following Equation 9.

$$\alpha = \frac{N * \sum (C1(n) * C2(n)) - \sum C1(n) * \sum C2(n)}{N * \sum (C1(n) * C1(n)) - \sum C1(n) * \sum C1(n)'}, \quad \text{[Equation 9]}$$

$$\beta = \frac{\sum C2(n) - \alpha * \sum C1(n)}{N}$$

In the Equation, C1(n) is a reference sample set or reference samples of a corresponding block of a first component, C2(n) is a reference sample set or reference samples of a current block of a second component and N is the number of reference samples.

In this case, a straight equation may be used to derive parameters of a linear model and may be derived by the following Equation 10.

$$\alpha = \frac{C2_B - C2_A}{C1_B - C1_A}, \beta = C2_A - \alpha * C1_A \quad \text{[Equation 10]}$$

In the Equation, C2A and C2B are values of reference samples corresponding to positions of A and B among reference samples of a current block of a second component and C1A and C1B are values of reference samples corresponding to positions of A and B among reference samples of a first component.

In deriving a linear prediction model in inter-image component prediction for a current block, a single linear model may be used.

Herein, a single linear model may mean one linear model derived from a reference sample of inter-image component prediction.

For example, as shown in FIG. 10, a linear model through a linear regression equation may be derived from a reference sample set of inter-image component prediction.

For example, as shown in FIG. 11, a linear model through a straight equation may be derived from samples corresponding to two positions among reference samples of inter-image component prediction. In this case, two positions of reference samples of inter-image component prediction may be positions having the minimum value and the maximum value among reference samples of a first component.

For example, a linear model through a straight equation may be derived from samples corresponding to two positions among reference samples of inter-image component prediction. In this case, two positions of reference samples of inter-image component prediction may be positions having the minimum value and the maximum value among reference samples of a second component.

In deriving a linear prediction model in inter-image component prediction for a current block, multiple linear models may be used.

Herein, multiple linear models may mean two or more linear models derived from a reference sample of inter-image component prediction. Herein, in deriving multiple linear models, a reference sample may be classified based on a component value of a reference sample.

For example, in deriving 2 linear models, a reference sample may be classified by using two pre-defined first component values. For example, in deriving 2 linear models as in FIG. 12, a reference sample may be classified by using an average of reference samples of a first component. In this case, multiple linear models may be derived by using a method of a single linear model from a separated reference sample.

In deriving a linear prediction model in inter-image component prediction for a current block, an outlier exclusion linear model may be derived.

In deriving an outlier exclusion linear model in inter-image component prediction, a linear model may be derived by using an outlier exclusion linear regression equation. In this case, a reference sample judged as an outlier among reference samples used for a linear regression equation may be excluded and a linear model may be derived through a linear regression equation using a reference sample that an outlier is judged to be excluded.

Herein, in deriving a linear model, outlier exclusion may mean a method in which at least one or more reference samples which may be judged as an outlier are removed or a method in which a reference sample that an outlier may be judged to be excluded is derived by operation processing using a plurality of reference samples. For example, among reference samples used for a linear regression equation, reference samples at positions where values of a first component have the minimum value and the maximum value may be judged as an outlier. For example, among reference samples used for a linear regression equation, reference samples at positions where values of a second component have the minimum value and the maximum value may be judged as an outlier.

In deriving an outlier exclusion linear model in inter-image component prediction, a linear model may be derived by using an outlier exclusion straight equation. In this case, a reference sample judged as an outlier among reference samples may be excluded and a linear model may be derived through a straight equation using a reference sample that an outlier is judged to be excluded.

For example, as in FIG. 13, reference samples at positions where values of a first component have the minimum value and the maximum value among reference samples may be judged as an outlier. For example, reference samples at positions where values of a second component have the minimum value and the maximum value among reference samples may be judged as an outlier.

For example, as in FIG. 14, reference samples may be classified into two categories and an average of first component reference sample values and an average of second component reference sample values may be calculated per each category. Grouping of reference samples may be performed based on comparison of a size between reference samples. For example, p reference samples may be arranged in ascending order and in this case, they may be classified into a first group configured with (p/2) higher reference samples and a second group configured with (p/2) lower reference samples. Herein, a first group may mean the minimum value group configured with relatively small values and a second group may mean the maximum value group configured with relatively large values. An average value may be calculated by using all or only some of reference samples belonging to a first group and a second group. Herein, some of reference samples may be n reference samples corresponding to a relatively small value among reference samples belonging to a first group and may be n reference samples corresponding to a relatively large value among reference samples belonging to a second group. A value of n may be an integer such as 2, 3, 4, or more. Parameters of a linear prediction model in Equation 10 may be derived by using an average value from a first group and an average value from a second group. Through such grouping and an average operation of reference samples, it can have an effect of excluding outliers.

Alternatively, a reference sample judged as an outlier may be excluded per each category and an average operation may be performed. Multiple linear models may be used to separate reference samples. In deriving an outlier exclusion linear model, a single linear model or multiple linear models may be used.

Generating an inter-component prediction sample S340, in performing inter-image component prediction encoding and/or decoding for a current block, may generate a prediction sample of a current block by using at least one or more methods of generating an inter-component prediction sample and prediction sample filtering.

In generating an inter-component prediction sample for a current block, a prediction sample of a current block of a second component may be generated by using parameters of a linear prediction model and a corresponding block of a first component.

When a size of a corresponding block of a first component is different from a size of a current block of a second component, subsampling may be performed. Subsampling may be performed for a pre-decoded corresponding block of a first component.

The subsampling may be performed by using a sample to be subsampled (hereinafter, a sub_target sample) and a sample neighboring at least one sub_target sample (hereinafter, a sub_neighboring sample). The sub_neighboring sample may include a sample neighboring the sub_target sample in at least one direction of a vertical, horizontal or diagonal direction. Herein, the sub_neighboring sample may include samples separated by a determined distance k as well as samples which are adjacent and connected to the sub_target sample. k may include a natural number such as 1, 2, 3, 4, or more. k may be a pre-promised fixed value or may be variably determined based on encoding information. The number of the sub_neighboring samples may be a natural number such as 1, 2, 3, 4, 5, 6, or more. The number may be a pre-promised fixed value or may be variably determined based on encoding information. For example, when a ratio of a size of a first component corresponding block and a size of a second component current block is r:1, a predetermined distance k may be r or r/2.

The subsampling may be performed by at least one of a weighted average value, an average value, the maximum value, the minimum value, a mode or a filtering value of samples to be used for the subsampling. Herein, a weighted average value may represent that an average is calculated by using a value multiplying each sample by a weight.

A weight applied to each sample may be determined based on the number of sub_neighboring samples to be used for subsampling.

For example, when 1 sub_neighboring sample is used, a weighted average of a sub_target sample and a sub_neighboring sample may be performed at a weight ratio of 1:1. Alternatively, when 2 sub_neighboring samples are used, a weighted average of a sub_target sample and sub_neighboring samples may be performed at a weight ratio of 2:1. Alternatively, when 4 sub_neighboring samples are used, a weighted average of a sub_target sample and sub_neighboring samples may be performed at a weight ratio of 4:1. Alternatively, when 5 sub_neighboring samples are used, for a weighted average, a weight of a sub_target sample may be 2 and a weight of sub_neighboring samples may be at least one of 1 or 2. In this case, a weight of sub_neighboring samples may be different according to a position of a sub_target sample.

Subsampling may be performed in the same way as a downsampling method applied to a reference sample of a first component block and in this case, a target sample may be considered as a sub_target sample and a neighboring sample may be considered as a sub_neighboring block, respectively.

FIG. 15 may be an example in which an inter-image component prediction sample is generated. Concretely, it is shown that because a size of a first component corresponding block is not the same as a size of a second component current block, subsampling for a first component corresponding block is performed, and then a second component current block is predicted by applying a linear prediction model to the subsampled block.

In generating an inter-component prediction sample for a current block, filtering for an inter-component prediction sample may be performed.

Filtering for a prediction block boundary of a second component may be performed.

When a current block of a second component is generated by inter-component prediction, smoothing filtering for the block boundary may be performed as in FIG. 16. In this case, filtering may be performed by using the following Equation 11.

[Equation 11]

$$p_{c2}[0][0] = (r_{c2}[-1][0] + 2 * p_{c2}[0][0] + r_{c2}[0][-1] + 2) \gg 2$$

$$p_{c2}[x][0] = (r_{c2}[x][-1] + 3 * p_{c2}[x][0] + 2) \gg 2$$

$$p_{c2}[0][y] = (r_{c2}[-1][y] + 3 * p_{c2}[0][y] + 2) \gg 2$$

pc2 means a prediction block of a second component and rc2 means a peripheral reference sample of a current block.

The filtering may be performed for all or some of samples of a prediction block of a second component. The filtering may be selectively applied only to a top sample line or a left sample line in a prediction block of a second component. The selection may be performed based on the above-described block attribute (e.g., a size, a shape, a ratio of a width and a height, etc.) The filter is just an example, and a type of a filter may be differently determined. In other words, the number of taps of a filter, a filter coefficient, filter strength, etc. may be differently determined. A different filter may be applied according to a position of a sample in an inter-component prediction block of a second component. The filter may be applied to 1, 2, or more top/left sample lines in an inter-component prediction block of a second component. A first filter and a second filter may be applied to a first sample line and a second sample line, respectively. A first filter and a second filter have at least one of the number of filter taps, filter strength or a filter coefficient different from each other. A filter coefficient of the filter may be variably determined by considering variation of a peripheral sample adjacent to an inter-component prediction block of a second component. The peripheral reference sample or peripheral sample may include at least one or more of a left sample, a top sample, a top-left sample of an inter-component prediction block in a second component or a sample determined depending on a position of a sample to be filtered (a x-coordinate, a y-coordinate).

The above-described inter-component prediction may be performed only when an indicator of an inter-component prediction mode is a first value. On the other hand, it may not be performed when an indicator of an inter-component prediction mode is a second value and in this case, information representing an intra prediction mode of a chroma component may be separately signaled. An intra prediction mode of a chroma component may be derived based on signaled information and a block of a chroma component may be predicted based on a derived intra prediction mode. It will be described in detail by referring to FIG. 17.

FIG. 17 shows an intra prediction method for a coding block of a chroma component as an embodiment to which the present disclosure is applied.

In reference to FIG. 17, an intra prediction mode of a coding block of a luma component (hereinafter, referred to as a luma block) may be derived S1700.

An intra prediction mode of a luma block may be derived based on an intra prediction mode list and index information. Herein, an intra prediction mode list may include candidate modes which may be used as an intra prediction mode of a current block. All or some of the candidate modes may be determined based on a peripheral block of a current block.

The peripheral block may mean a block which is adjacent to at least one of the left, the right, the top, the bottom-left, the top-left, the bottom-right or the top-right of a current block. When there are a plurality of left blocks of a current block, only a left block located in at least one of an topmost position, a central position or a bottommost position may be used. Alternatively, when there are a plurality of top blocks, only a top block located in at least one of a leftmost position, a central position or a rightmost position may be used. The number of the peripheral blocks may be 1, 2, 3, 4, 5, or more. The number may be the fixed number which is pre-defined in an encoder/decoder. The number may be variably determined based on the above-described encoding information. Alternatively, the number may be encoded in an encoder and signaled. The signaling may be performed in a level of at least one of a video sequence, a picture, a slice, a tile or a predetermined partial region (e.g., CTU row, CTU, CU, PU, etc.)

The candidate mode may be determined based on at least one of (A) whether intra prediction modes of the above-described neighboring blocks is the same, (B) whether an intra prediction mode of a neighboring block is a directional mode, (C) whether an intra prediction mode of a first neighboring block is greater than an intra prediction mode of a second neighboring block, or (D) whether a difference between intra prediction modes between neighboring blocks is the same as a predetermined threshold value. The threshold value may be an arbitrary natural number belonging to a range from 1 to (NumIntraAngMode-1). NumIntraAngMode means the total number of directional modes which are pre-defined in an encoding/decoding device and may be 65.

The candidate mode may be configured with at least one of an intra prediction mode of one or more peripheral blocks, a mode derived by adding or subtracting a value of n to or from an intra prediction mode of a peripheral block, or a default mode. Herein, a value of n may be an integer such as 1, 2, 3, or more. A value of n may be variably determined based on at least one of the above-described (A) to (D). The default mode may include at least one of a Planar mode or a DC mode.

An encoding/decoding device may define m intra prediction mode lists. Herein, m may be 1, 2, 3, or more. For example, it is assumed that m is 3. In this case, a first intra prediction mode list may be derived by the above-described method of determining a candidate mode. A second intra prediction mode list may be derived by the above-described method of determining a candidate mode, but it may not include a candidate mode belonging to a first intra prediction mode list. A third intra prediction mode list may be configured with remaining modes excluding candidate modes belonging to first and second intra prediction mode lists.

A luma block may selectively use any one of a plurality of intra prediction mode lists and for it, a plurality of flag information may be used.

For example, when a first flag is a first value, a first or second intra prediction mode list may be used and when a first flag is a second value, a third intra prediction mode list may be used. In other words, a first flag may represent whether a third intra prediction mode list is used. When a first flag is a first value, a second flag may be additionally signaled. When a second flag is a first value, a first intra prediction mode list may be used and otherwise, a second intra prediction mode list may be used.

Alternatively, when a first flag is a first value, a first intra prediction mode list may be used and when a first flag is a second value, a second or third intra prediction mode list may be used. In other words, a first flag may represent whether a first intra prediction mode list is used. If a first flag is a second value, a second flag may be additionally signaled. When a second flag is a first value, a second intra prediction mode list may be used and otherwise, a third intra prediction mode list may be used.

In an example, an intra prediction mode list of a luma block according to the above-described method of determining a candidate mode may be configured as follows.

A first intra prediction mode list may be configured only with a default mode. For example, a first intra prediction mode list may be configured only with a planar mode or only with a DC mode.

When a plurality of default modes are included in a first intra prediction mode list, first index information specifying any one of a plurality of default modes may be signaled. A candidate mode specified by first index information may be set as an intra prediction mode of a luma block. But, when only one default mode is included in a first intra prediction mode list, signaling of first index information may be omitted. In this case, when a first intra prediction mode list is used according to the above-described flag, an intra prediction mode of a luma block may be set as a candidate mode of a first intra prediction mode list.

A candidate mode of a second intra prediction mode list may be selected from remaining modes excluding the default mode among intra prediction modes which are pre-defined in an encoding/decoding device. Herein, the number of candidate modes may be 1, 2, 3, 4, 5, 6, or more.

Concretely, a MPM candidate may be determined by considering whether an intra prediction mode of a left block (candIntraPredModeA) and an intra prediction mode of a top block (candIntraPredModeB) are the same and whether candIntraPredModeA and candIntraPredModeB are a non-directional mode.

For example, when candIntraPredModeA and candIntraPredModeB are the same and candIntraPredModeA is not a nondirectional mode, a MPM candidate of a current block may include at least one of candIntraPredModeA, (candIntraPredModeA−n), (candIntraPredModeA+n) or a nondirectional mode. Herein, n may be an integer such as 1, 2, or more. The nondirectional mode may include at least one of a Planar mode or a DC mode. In an example, a candidate mode of a luma block may be determined as in the following Table 3. An index in Table 3 specifies a position or a priority of a candidate mode, but it is not limited thereto.

TABLE 3

| index | MPM candidate |
|---|---|
| 0 | candIntraPredModeA |
| 1 | 2 + ((candIntraPredModeA + 61) % 64) |
| 2 | 2 + ((candIntraPredModeA − 1) % 64) |
| 3 | 2 + ((candIntraPredModeA + 60) % 64) |
| 4 | 2 + (candIntraPredModeA % 64) |

Alternatively, when candIntraPredModeA and candIntraPredModeB are not the same and both candIntraPredModeA and candIntraPredModeB are not a nondirectional mode, a MPM candidate of a current block may include at least one of candIntraPredModeA, candIntraPredModeB, (maxAB−n), (maxAB+n), (minAB−n), (minAB+n) or a nondirectional mode. Herein, maxAB and minAB may mean the maximum value and the minimum value of candIntraPredModeA and candIntraPredModeB, respectively, and n may be an integer such as 1, 2, or more. The nondirectional mode may include at least one of a Planar mode or a DC mode. In an example, a candidate mode may be determined as in the following Table 4 based on a difference value (D) between candIntraPredModeA and candIntraPredModeB.

TABLE 4

| index | Candidate Mode 1 (D = 1) | Candidate Mode 2 (D = 2) | Candidate Mode 3 (D >= 62) | Candidate Mode 4 (Otherwise) |
|---|---|---|---|---|
| 0 | candIntraPredModeA | candIntraPredModeA | candIntraPredModeA | candIntraPredModeA |
| 1 | candIntraPredModeB | candIntraPredModeB | candIntraPredModeB | candIntraPredModeB |
| 2 | 2 + ((minAB + 61) % 64) | 2 + ((minAB − 1) % 64) | 2 + ((minAB − 1) % 64) | 2 + ((minAB + 61) % 64) |
| 3 | 2 + ((maxAB − 1) % 64) | 2 + ((minAB + 61) % 64) | 2 + ((maxAB + 61) % 64) | 2 + ((minAB − 1) % 64) |
| 4 | 2 + ((minAB + 60) % 64) | 2 + ((maxAB − 1) % 64) | 2 + (minAB % 64) | 2 + ((maxAB + 61) % 64) |

Alternatively, when candIntraPredModeA and candIntraPredModeB are not the same and only any one of candIntraPredModeA and candIntraPredModeB is a nondirectional mode, a candidate mode of a luma block may include at least one of maxAB, (maxAB−n), (maxAB+n) or a nondirectional mode. Herein, maxAB may mean the maximum value of candIntraPredModeA and candIntraPredModeB and n may be an integer such as 1, 2, more. The nondirectional mode may include at least one of a Planar mode or a DC mode. In an example, a MPM candidate of a current block may be determined as in the following Table 5. An index in Table 5 specifies a position or a priority of a MPM candidate, but it is not limited thereto.

TABLE 5

| index | MPM candidate |
|---|---|
| 0 | maxAB |
| 1 | 2 + ((maxAB + 61) % 64) |
| 2 | 2 + ((maxAB − 1) % 64) |
| 3 | 2 + ((maxAB + 60) % 64) |
| 4 | 2 + (maxAB % 64) |

Alternatively, when candIntraPredModeA and candIntraPredModeB are not the same and both candIntraPredModeA and candIntraPredModeB are a nondirectional mode, a candidate mode of a luma block may include at least one of a nondirectional mode, a vertical mode, a horizontal mode, (a vertical mode−m), (a vertical mode+m), (a horizontal mode-m) or (a horizontal mode+m). Herein, m may be an integer such as 1, 2, 3, 4, or more. The nondirectional mode may include at least one of a Planar mode or a DC mode. In an example, a candidate mode of a luma block may be determined as in the following Table 6. An index in Table 6 specifies a position or a priority of a candidate mode, but it is not limited thereto. For example, an index 1 or the largest index may be assigned to a horizontal mode. In addition, a candidate mode may include at least one of a diagonal mode (e.g., mode 2, mode 34, mode 66), (a diagonal mode−m) or (a diagonal mode+m).

TABLE 6

| Index | MPM candidate |
|---|---|
| 0 | INTRA_DC |
| 1 | Vertical Mode |
| 2 | Horizontal Mode |
| 3 | (Vertical Mode − 4) |
| 4 | (Vertical Mode + 4) |

As described above, a second intra prediction mode list may include a plurality of candidate modes. Index information specifying any one of a plurality of candidate modes may be signaled. A candidate mode specified by signaled index information may be set as an intra prediction mode of a luma block. But, when first and second intra prediction mode lists are not used according to the above-described flag, remaining mode information may be additionally signaled. Remaining mode information may specify any one of remaining modes excluding candidate modes belonging to first and second intra prediction mode lists. A mode specified by remaining mode information may be set as an intra prediction mode of a luma block.

In reference to FIG. 17, information representing an intra prediction mode of a coding block of a chroma component (hereinafter, referred to as a chroma block) may be decoded S1710.

The information may be decoded by CABAC based entropy-decoding and may have a value of any one of 0 to 4. Herein, entropy-decoding may include an inverse-binarization process as in the following Table 7.

TABLE 7

| Value of intra_chroma_pred_mode | Bin string |
|---|---|
| 0 | 100 |
| 1 | 101 |
| 2 | 110 |
| 3 | 111 |
| 4 | 0 |

In reference to FIG. 17, based on the pre-derived intra prediction mode of a luma block and decoded information (intra_chroma_pred_mode), an intra prediction mode of a chroma block may be derived S1720. For example, in case that intra_chroma_pred_mode is 0, an intra prediction mode of a chroma block may be set as a diagonal mode (mode 66) in a top-right direction when an intra prediction mode of a luma block is a planar mode and otherwise, an intra prediction mode of a chroma block may be set as a planar mode.

Alternatively, in case that intra_chroma_pred_mode is 1, an intra prediction mode of a chroma block may be set as a diagonal mode (mode 66) in a top-right direction when an intra prediction mode of a luma block is a vertical mode (mode 50) and otherwise, an intra prediction mode of a chroma block may be set as a vertical mode.

Alternatively, in case that intra_chroma_pred_mode is 2, an intra prediction mode of a chroma block may be set as a diagonal mode (mode 66) in a top-right direction when an intra prediction mode of a luma block is a horizontal mode (mode 18) and otherwise, an intra prediction mode of a chroma block may be set as a horizontal mode.

Alternatively, in case that intra_chroma_pred_mode is 3, an intra prediction mode of a chroma block may be set as a diagonal mode (mode 66) in a top-right direction when an intra prediction mode of a luma block is a DC mode and otherwise, an intra prediction mode of a chroma block may be set as a DC mode.

Alternatively, when intra_chroma_pred_mode is 4, an intra prediction mode of a chroma block may be set the same as an intra prediction mode of a luma block.

In reference to FIG. 17, intra prediction for a chroma block may be performed based on an intra prediction mode of a chroma S1730.

Concretely, based on an intra prediction mode of a chroma block, a reference region among peripheral regions of a chroma block may be determined. Herein, a peripheral sample may mean a region which is adjacent to at least one of the left, the top, the top-left, the top-right or the bottom-right of a chroma block. The reference region may include at least one of a plurality of consecutive sample lines neighboring a chroma block. A chroma block may refer to only a sample line which does not adjoin a chroma block among a plurality of sample lines.

A sample of a chroma block may be predicted based on a pre-reconstructed sample of the determined reference region.

A variety of embodiments of the present disclosure do not enumerate all possible combinations, but are to describe the representative aspect of the present disclosure and matters described in various embodiments may be independently applied or may be applied by two or more combinations.

In addition, a variety of embodiments of the present disclosure may be implemented by a hardware, a firmware, a software, or their combination, etc. For implementation by a hardware, implementation may be performed by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general processors, controllers, microcontrollers, microprocessors, etc.

A range of the present disclosure includes software or machine-executable instructions (e.g., an operating system, an application, a firmware, a program, etc.) which execute an action according to a method of various embodiments in a device or a computer and a non-transitory computer-readable medium that such software or instructions, etc. are stored and are executable in a device or a computer.

INDUSTRIAL APPLICABILITY

Embodiments of the present disclosure as described above may be used in a decoding/encoding device or method, etc. for a video or an image.

What is claimed is:

1. An image decoding method, comprising:

determining an inter-component prediction mode of a chroma component block based on an inter-component prediction mode list and predetermined index information, wherein the inter-component prediction mode list is configured with k inter-component prediction modes;

downsampling reference samples for inter-component prediction of the chroma component block based on the determined inter-component prediction mode, the reference samples belonging to at least one of a left neighboring block or a top neighboring block of a luma component block corresponding to the chroma component block;

classifying the downsampled reference samples into a first group and a second group, wherein the first group represents a minimum value group of first downsampled reference samples having relatively small values among the downsampled reference samples and the second group represents a maximum value group of second downsampled reference samples having relatively large values among the downsampled reference samples;

obtaining a first average value between the first downsampled reference samples in the first group and a second average value between the second downsampled reference samples in the second group;

calculating a difference between the first average value and the second average value;

deriving a parameter of a linear prediction model based on the difference between the first average value of the first group and the second average value of the second group; and performing the inter-component prediction on the chroma component block based on the parameter of the linear prediction model, wherein a filter for the downsampling is variably determined based on whether a top boundary of the luma component block is on a top boundary of a coding tree unit (CTU) to which the luma component block belongs.

2. The method of claim 1, wherein the downsampling is selectively performed for a reference sample at a specific position.

3. The method of claim 2, wherein the specific position is determined based on encoding information on at least one of the chroma component block or the luma component block.

4. The method of claim 3, wherein the downsampling is performed based on a neighboring sample adjacent to the reference sample at the specific position in at least one of a vertical direction, a horizontal direction or a diagonal direction.

5. The method of claim 4, wherein the downsampling is performed based on at least one of availability of a neighboring block of the luma component block or a CTU related parameter.

6. An image encoding method, comprising:

determining an inter-component prediction mode of a chroma component block from an inter-component prediction mode list including k inter-component prediction modes;

downsampling reference samples for inter-component prediction of the chroma component block based on the determined inter-component prediction mode, the reference samples belonging to at least one of a left neighboring block or a top neighboring block of a luma component block corresponding to the chroma component block;

classifying the downsampled reference samples into a first group and a second group, wherein the first group represents a minimum value group of first downsampled reference samples having relatively small values among the downsampled reference samples and the second group represents a maximum value group of second downsampled reference samples having relatively large values among the downsampled reference samples;

obtaining a first average value between the first downsampled reference samples in the first group and a second average value between the second downsampled reference samples in the second group;

calculating a difference between the first average value and the second average value;

deriving a parameter of a linear prediction model based on the difference between the first average value of the first group and the second average value of the second group; and performing the inter-component prediction on the chroma component block based on the parameter of the linear prediction model, wherein a filter for the downsampling is variably determined based on whether a top boundary of the luma component block is on a top boundary of a coding tree unit (CTU) to which the luma component block belongs.

7. The method of claim 6, wherein the downsampling is selectively performed for a reference sample at a specific position.

8. The method of claim 7, wherein the specific position is determined based on encoding information on at least one of the chroma component block or the luma component block.

9. The method of claim 8, wherein the downsampling is performed based on a neighboring sample adjacent to the reference sample at the specific position in at least one of a vertical direction, a horizontal direction or a diagonal direction.

10. The method of claim 9, wherein the downsampling is performed based on at least one of availability of a neighboring block of the luma component block or a CTU related parameter.

11. An encoder apparatus configured to:

determine an inter-component prediction mode of a chroma component block from an inter-component prediction mode list including k inter-component prediction modes;

downsample reference samples for inter-component prediction of the chroma component block based on the determined inter-component prediction mode, the reference samples belonging to at least one of a left neighboring block or a top neighboring block of a luma component block corresponding to the chroma component block;

classify the downsampled reference samples into a first group and a second group, wherein the first group represents a minimum value group of first downsampled reference samples having relatively small values among the downsampled reference samples and the second group represents a maximum value group of second downsampled reference samples having relatively large values among the downsampled reference samples;

obtain a first average value between the first downsampled reference samples in the first group and a second average value between the second downsampled reference samples in the second group;

calculate a difference between the first average value and the second average value;

derive a parameter of a linear prediction model based on the difference between the first average value of the first group and the second average value of the second group; and perform the inter-component prediction on the chroma component block based on the parameter of the linear prediction model, wherein a filter for the downsampling is variably determined based on whether a top boundary of the luma component block is on a top boundary of a coding tree unit (CTU) to which the luma component block belongs.

12. The encoder apparatus of claim 11, wherein the downsampling is selectively performed for a reference sample at a specific position.

13. The encoder apparatus of claim 12, wherein the specific position is determined based on encoding information on at least one of the chroma component block or the luma component block.

14. The encoder apparatus of claim 13, wherein the apparatus is configured to downsample based on a neighboring sample adjacent to the reference sample at the specific position in at least one of a vertical direction, a horizontal direction or a diagonal direction.

15. The encoder apparatus of claim 14, wherein the apparatus is configured to downsample based on at least one of availability of a neighboring block of the luma component block or a CTU related parameter.

16. The encoder apparatus of claim 14, wherein the apparatus is configured to downsample at least based on a predetermined flag that represents whether a sample of the chroma component block has a position shifted by a predetermined distance from a corresponding sample position of the luma component block.

17. The method of claim 4, wherein the downsampling is performed at least based on a predetermined flag that represents whether a sample of the chroma component block has a position shifted by a predetermined distance from a corresponding sample position of the luma component block.

18. The method of claim 9, wherein the downsampling is performed at least based on a predetermined flag that represents whether a sample of the chroma component block has a position shifted by a predetermined distance from a corresponding sample position of the luma component block.

19. The method of claim 1, wherein, in response to a case where the top boundary of the luma component block is on the top boundary of the coding tree unit, a first filter having n-taps is used for the downsampling, wherein, in response to a case where the top boundary of the luma component block is not on the top boundary of the coding tree unit, a second filter having m-taps is used for the downsampling, and wherein n and m are different from each other.

20. The method of claim 19, wherein n is equal to 3 and m is equal to 6.

* * * * *